United States Patent
Huang

(10) Patent No.: US 11,316,909 B2
(45) Date of Patent: Apr. 26, 2022

(54) DATA TRANSMISSION METHOD AND APPARATUS, AND COMPUTER STORAGE MEDIUM

(71) Applicant: Tencent Technology (Shenzhen) Company Limited, Shenzhen (CN)

(72) Inventor: Liuwen Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/159,067

(22) Filed: Jan. 26, 2021

(65) Prior Publication Data

US 2021/0152616 A1    May 20, 2021

Related U.S. Application Data

(63) Continuation of application No. PCT/CN2020/097073, filed on Jun. 19, 2020.

(30) Foreign Application Priority Data

Sep. 26, 2019  (CN) .......................... 201910917290.9

(51) Int. Cl.
  *H04L 65/403*  (2022.01)
  *H04L 65/1045* (2022.01)
  (Continued)

(52) U.S. Cl.
  CPC .......... *H04L 65/403* (2013.01); *H04L 65/105* (2013.01); *H04L 65/1069* (2013.01); *H04L 65/605* (2013.01)

(58) Field of Classification Search
  CPC . H04L 65/403; H04L 65/105; H04L 65/1069; H04L 65/605
  (Continued)

(56) References Cited

U.S. PATENT DOCUMENTS 8,239,905 B2   8/2012 Li et al.
9,584,557 B2 * 2/2017 Panje ................. H04L 65/4084
               (Continued)

FOREIGN PATENT DOCUMENTS

CN    1474540 A    2/2004
CN  101612918 A   12/2009
       (Continued)

OTHER PUBLICATIONS

Tencent Technology, ISR, PCT/CN2020/097073, dated Aug. 28, 2020, 2 pgs.

*Primary Examiner* — Zi Ye
(74) *Attorney, Agent, or Firm* — Morgan, Lewis & Bockius LLP

(57) ABSTRACT

A data transmission method and apparatus, and a computer storage medium are disclosed in this application. The method includes: receiving, by a conference management server, a connection request transmitted by a live streaming terminal; assigning a signaling server and a data transmission proxy server to a region according to region information, and the signaling server establishes a connection to a multimedia device; assigning a multimedia device proxy server to the multimedia device in response to detecting that the connection between the signaling server and the multimedia device is successfully established; assigning a live streaming proxy server to the live streaming terminal in response to a live streaming operation of the live streaming terminal; and performing, by using the data transmission proxy server, the multimedia device proxy server, and the live streaming proxy server, format conversion on data to be transmitted between the live streaming terminal and the multimedia device.

20 Claims, 9 Drawing Sheets

(51) Int. Cl.
*H04L 65/1069* (2022.01)
*H04L 65/60* (2022.01)

(58) Field of Classification Search
USPC .......................................................... 709/204
See application file for complete search history.

(56) References Cited

U.S. PATENT DOCUMENTS

| | | | |
|---|---|---|---|
| 2003/0081587 | A1 | 5/2003 | Ichiyoshi |
| 2005/0283536 | A1* | 12/2005 | Swanson ................ G06Q 10/10 709/232 |
| 2011/0033035 | A1* | 2/2011 | Turner ................ H04M 7/0009 379/202.01 |
| 2013/0117418 | A1* | 5/2013 | Mutton .......... H04N 21/234309 709/219 |
| 2014/0267570 | A1* | 9/2014 | Weber ...................... H04N 7/15 348/14.08 |
| 2015/0193739 | A1* | 7/2015 | Min .................... G06Q 10/1095 705/7.19 |

FOREIGN PATENT DOCUMENTS

| | | | |
|---|---|---|---|
| CN | 102281460 | A | 12/2011 |
| CN | 102427463 | A | 4/2012 |
| CN | 103338348 | A | 10/2013 |
| CN | 104754284 | A | 7/2015 |
| CN | 105025314 | A | 11/2015 |
| CN | 106878071 | A * | 6/2017 |
| CN | 107959819 | A | 4/2018 |
| CN | 108055496 | A | 5/2018 |
| CN | 108289187 | A | 7/2018 |
| CN | 108881933 | A | 11/2018 |
| CN | 109525854 | A | 3/2019 |
| CN | 109688416 | A | 4/2019 |
| CN | 109788072 | A | 5/2019 |
| CN | 110198431 | A | 9/2019 |
| CN | 110661801 | A | 1/2020 |

* cited by examiner

DATA TRANSMISSION METHOD AND APPARATUS, AND COMPUTER STORAGE MEDIUM

CROSS REFERENCE TO RELATED APPLICATIONS

This application is a continuation application of PCT Patent Application No. PCT/CN2020/097073, entitled "DATA TRANSFER METHODS, DEVICES, AND COMPUTER STORAGE MEDIA" filed on Jun. 19, 2020, which claims priority to Chinese Patent Application No. 201910917290.9, filed with the State Intellectual Property Office of the People's Republic of China on Sep. 26, 2019, and entitled "DATA TRANSMISSION METHOD AND APPARATUS, AND COMPUTER STORAGE MEDIUM", all of which are incorporated herein by reference in their entirety.

FIELD OF THE TECHNOLOGY

This application relates to the field of computer technologies, and specifically, to a data transmission method and apparatus, and a computer storage medium.

BACKGROUND OF THE DISCLOSURE

A conventional multimedia playback system is a system including multimedia devices such as an audio/video acquisition terminal, a playback terminal, a multipoint control unit (MCU), and a private line network, and deployed in regions such as companies and government institutions.

The conventional multimedia playback system may acquire data by using the audio/video acquisition terminal, transmit the data by using the private line network, implement multi-channel intercommunication by using cascaded MCU devices, and perform playback by using the playback terminal.

The conventional multimedia playback system can support an audio/video conference, but can be used only at a fixed place such as a conference room. Therefore, the application of the conventional multimedia playback system is inflexible.

SUMMARY

Embodiments of this application provide a data transmission method and apparatus, and a computer storage medium, to improve the flexibility of data transmission. The technical solutions are as follows:

According to an aspect, a data transmission method is provided, applicable to a network online conference system, the network online conference system including: a conference management server, a signaling server, a data transmission proxy server, a multimedia device proxy server, and a live streaming proxy server, the method including:

receiving, by the conference management server, a connection request transmitted by a live streaming terminal, the connection request including region information of a region in which a multimedia device to be connected is located;

assigning, by the conference management server, the signaling server and the data transmission proxy server to the region according to the region information, wherein the signaling server establishes a connection to the multimedia device;

assigning, by the conference management server, the multimedia device proxy server to the multimedia device in response to detecting that the connection between the signaling server and the multimedia device is successfully established;

assigning, by the conference management server, the live streaming proxy server to the live streaming terminal in response to a live streaming operation of the live streaming terminal; and performing, by using the data transmission proxy server, the multimedia device proxy server, and the live streaming proxy server, format conversion on data to be transmitted between the live streaming terminal and the multimedia device.

According to another aspect, a data transmission apparatus is provided, including:

a receiving module, configured to receive a connection request transmitted by a live streaming terminal, the connection request including region information of a region in which a multimedia device to be connected is located;

a first assignment module, configured to assign a corresponding signaling server and a data transmission proxy server to the region according to the region information, and trigger the signaling server to establish a connection to the multimedia device;

a second assignment module, configured to assign a multimedia device proxy server to the multimedia device in response to detecting that the connection between the signaling server and the multimedia device is successfully established;

a third assignment module, configured to assign a live streaming proxy server to the live streaming terminal in response to a live streaming operation of the live streaming terminal; and a data transmission module, configured to perform, by using the data transmission proxy server, the multimedia device proxy server, and the live streaming proxy server, format conversion on data to be transmitted between the live streaming terminal and the multimedia device.

The third assignment module is further configured to obtain port information of an interface machine corresponding to the live streaming operation based on the live streaming operation of the live streaming terminal, assign the live streaming proxy server to the live streaming terminal, determine port information of the live streaming proxy server, and synchronize the respective port information between the interface machine and the live streaming proxy server.

In some embodiments, in some embodiments, the data transmission module may include a first receiving submodule, a conversion submodule, and a transmission submodule.

The first receiving submodule is configured to receive, by using the live streaming proxy server, multimedia (e.g., audio/video) live streaming data transmitted by the live streaming terminal.

The conversion submodule is configured to perform format conversion on the multimedia live streaming data by using the live streaming proxy server, to obtain multimedia playback data.

The transmission submodule is configured to transmit the multimedia playback data to the multimedia device by using the data transmission proxy server, the multimedia device proxy server, and the live streaming proxy server.

The transmission submodule is further configured to transmit the multimedia playback data to the multimedia device proxy server by using the live streaming proxy server; transmit the multimedia playback data to the data transmission proxy server by using the multimedia device proxy server; and transmit the multimedia playback data to the multimedia device by using the data transmission proxy server.

The data transmission apparatus is further configured to receive a creation request transmitted by the live streaming terminal; generate a live streaming number according to the creation request; and return the live streaming number to the live streaming terminal, so that the live streaming terminal performs the live streaming operation according to the live streaming number.

The data transmission apparatus is further configured to receive a device list obtaining request transmitted by the live streaming terminal; obtain a device list according to the device list obtaining request, the device list including a mapping relationship between the multimedia device and the region; and return the device list to the live streaming terminal, so that the live streaming terminal selects, according to the device list, the region in which the multimedia device to be connected is located.

The data transmission apparatus is further configured to determine port information of the data transmission proxy server and port information of the multimedia device proxy server; and synchronize the respective port information between the data transmission proxy server and the multimedia device proxy server.

The data transmission apparatus is further configured to determine port information of the live streaming proxy server and port information of the multimedia device proxy server; and synchronize the respective port information between the live streaming proxy server and the multimedia device proxy server.

The data transmission apparatus is further configured to store the port information into a blockchain.

According to another aspect, a non-transitory computer-readable storage medium is provided, storing a plurality of instructions, the instructions being suitable to be loaded by a computer system acting as a network online conference system, the network online conference system comprising a conference management server, a signaling server, a data transmission proxy server, a multimedia device proxy server, and a live streaming proxy server, causing the computer system to perform the operations of the data transmission method according to the embodiments of this application.

According to another aspect, a computer system acting as a network online conference system is provided, the network online conference system comprising a conference management server, a signaling server, a data transmission proxy server, a multimedia device proxy server, and a live streaming proxy server, the computer system including a memory storing a plurality of instructions, the instructions being suitable to be loaded by a processor, to perform the operations of the data transmission method according to the embodiments of this application.

According to another aspect, a computer program product is provided, the computer program product or computer program including computer instructions, the computer instructions being stored in a computer-readable storage medium. A processor of a computer device reads the computer instructions from the computer-readable storage medium, and executes the computer instructions, so that the computer device performs the data transmission method provided in the foregoing optional implementations.

The technical solutions provided in the embodiments of this application have at least the following beneficial effects:

In the embodiments of this application, the connection request transmitted by the live streaming terminal may be received; the corresponding signaling server and the data transmission proxy server are assigned to the region according to the region information, and the signaling server is triggered to establish a connection to the multimedia device; the multimedia device proxy server is assigned to the multimedia device when it is detected that the connection between the signaling server and the multimedia device is successfully established; the live streaming proxy server is assigned to the live streaming terminal based on the live streaming operation of the live streaming terminal; and format conversion is performed, by using the data transmission proxy server, the multimedia device proxy server, and the live streaming proxy server, on the data to be transmitted, to transmit the data between the live streaming terminal and the multimedia device. In this solution, a live streaming system used when a live streaming user performs live streaming and a multimedia playback system in which a multimedia device is located may be integrated, to implement data transmission between the live streaming terminal and the multimedia device, thereby improving the flexibility of data transmission.

BRIEF DESCRIPTION OF THE DRAWINGS

To describe the technical solutions of the embodiments of this application more clearly, the following briefly describes the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

Figure 1:
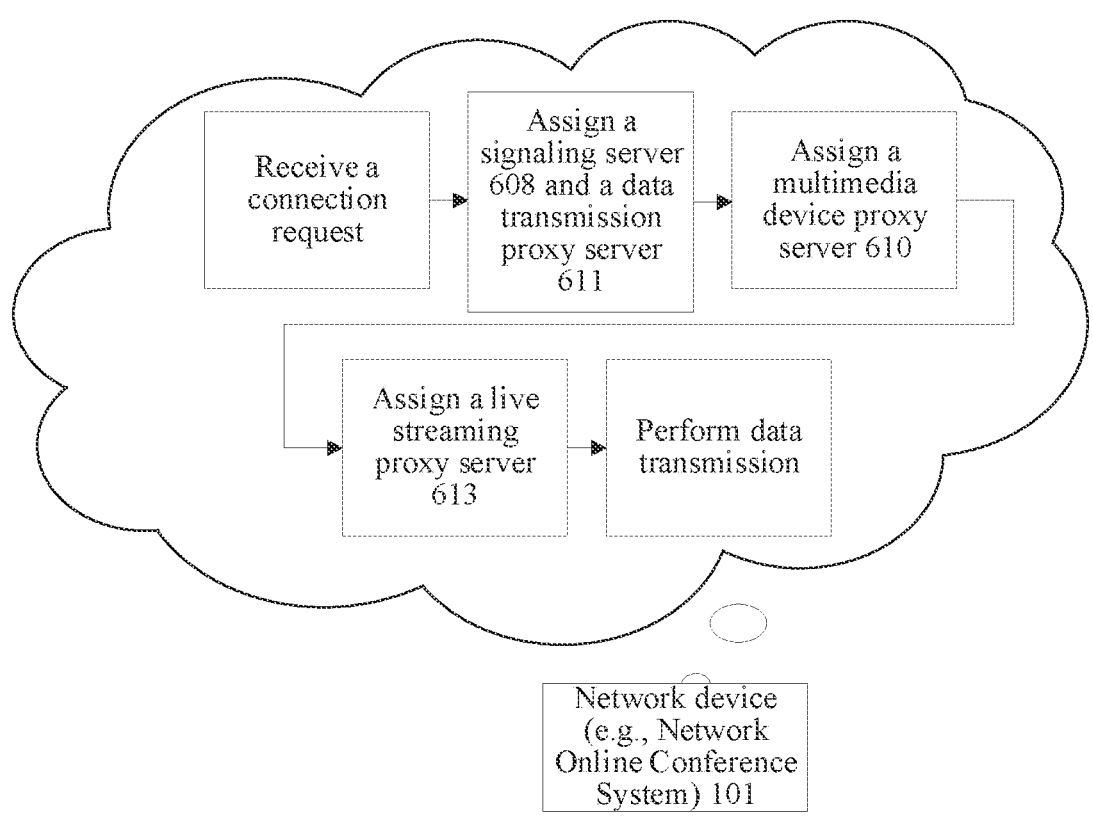
FIG. 1 is a schematic diagram of a scenario of a data transmission system according to an embodiment of this application.

To make the objectives, technical solutions, and advantages of this application clearer, the following further describes implementations of this application in detail with reference to the accompanying drawings.

Referring to the drawings, same component symbols represent same components. A principle of this application is described by using examples in which this application is implemented in proper computing environments. The following descriptions are specific embodiments of this application based on the examples, and are not to be construed as a limitation to other specific embodiments of this application that are not described herein in detail.

In the following description, the specific embodiments of this application are described with reference to steps and symbols of operations that are performed by one or more computers, unless indicated otherwise. Therefore, such steps and operations, which are at times referred to as being computer-executed, include the manipulation by the processing unit of the computer of electrical signals representing data in a structured form. This manipulation transforms the data or maintains the data at locations in the memory system of the computer, which reconfigures or otherwise alters the operation of the computer in a manner well understood by a person skilled in the art. Data structures in which the data is maintained are physical locations of the memory that have particular properties defined by the format of the data. However, while the principle of this application is being described in the foregoing text, it is not meant to be limiting as a person skilled in the art will appreciate that various steps and operations described below may also be implemented in hardware.

A term "module" used in the specification may be considered as a software object executed in the calculation system. Different components, modules, engines, and services described in the specification may be considered as objects implemented in the calculation system. The apparatus, method, component, module, unit, and engine described in the specification may be implemented in a form of software (e.g., developed using a computer programming language), hardware (e.g., processor or processor and memory), or a combination thereof. Each implementation falls within the protection scope of this application. Each module, unit, or engine can be implemented using one or more processors (or processors and memory). Likewise, a processor (or processors and memory) can be used to implement one or more modules, units, or engines. Moreover, each module, unit, or engine can be part of an overall module, unit, or engine that includes the functionalities of each module, unit, or engine.

In this application, the terms "first", "second", "third", and the like are intended to distinguish between different objects but do not indicate a particular order. In addition, the terms "include", "have", and any variant thereof are intended to cover a non-exclusive inclusion. For example, a process, method, system, product, or device that includes a series of steps or modules is not limited to the listed steps or modules. Instead, some embodiments further include a step or module that is not listed, or some embodiments further include another step or module that is intrinsic to the process, method, product, or device.

"Embodiment" mentioned in the specification means that particular features, structures, or characteristics described with reference to the embodiment may be included in at least one embodiment of this application. The term appearing at different positions of the specification may not refer to the same embodiment or an independent or alternative embodiment that is mutually exclusive with another embodiment. A person skilled in the art explicitly or implicitly understands that the embodiments described in the specification may be combined with other embodiments.

An embodiment of this application provides a data transmission method. The data transmission method may be performed by a data transmission apparatus provided in an embodiment of this application, or a network online conference system integrated with the data transmission apparatus. The data transmission apparatus may be implemented in a hardware or software manner. The network online conference system may be a device such as a smartphone, a tablet computer, a palmtop computer, a notebook computer, or a desktop computer. The network online conference system includes, but is not limited to, a computer, a network host, a single network server, a plurality of network server sets, or a cloud formed by a plurality of servers.

FIG. 1 is a schematic diagram of an application scenario of a data transmission method according to an embodiment of this application. For example, the data transmission apparatus is integrated into a network device or network online conference system 101. In some embodiments, the network online conference system 101 may receive a connection request transmitted by a live streaming terminal; assign a corresponding signaling server 608 and a data transmission proxy server 611 to a region according to region information, and trigger the signaling server 608 to establish a connection to a multimedia device; assign a multimedia device proxy server 610 to the multimedia device in response to detecting that the connection between the signaling server 608 and the multimedia device is successfully established; assign a live streaming proxy server 613 to the live streaming terminal in response to a live streaming operation of the live streaming terminal; and perform, by using the data transmission proxy server 611, the multimedia device proxy server 610, and the live streaming proxy server 613, format conversion on data to be transmitted, to transmit the data between the live streaming terminal and the multimedia device.

Figure 2:
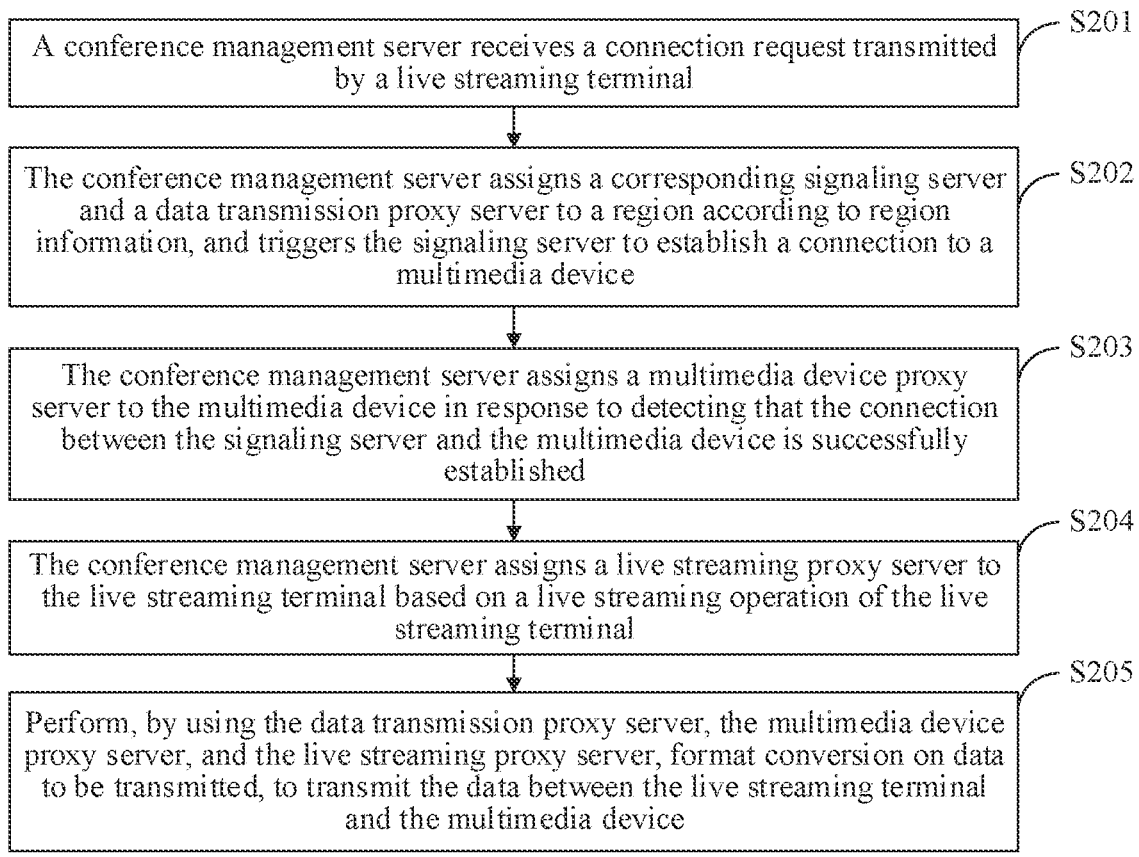
FIG. 2 is a first flowchart of a data transmission method according to an embodiment of this application.

FIG. 2 is a schematic flowchart of a data transmission method according to an embodiment of this application. The method is performed by the network online conference system shown in FIG. 1. The network online conference system includes a conference management server, a signaling server, a data transmission proxy server, a multimedia device proxy server, and a live streaming proxy server. Details are described by using the following embodiment:

201: The conference management server receives a connection request transmitted by a live streaming terminal.

A multimedia playback system is a system including multimedia devices such as an audio/video acquisition terminal, an audio/video playback terminal, a multipoint control unit (MCU), and a private line network, and deployed in regions such as companies and government institutions. In some embodiments, the multimedia playback system acquires data by using the audio/video acquisition terminal, transmits the data by using the private line network, implements multi-channel intercommunication by using cascaded MCU devices, and performs playback by using the playback terminal. For example, optionally, the multimedia playback system is a video conference system. In some embodiments, the video conference system supports an audio/video conference, but can be used only at a fixed place such as a conference room.

A live streaming system is a system integrated in various live streaming applications or communication applications in a manner of a software development kit (SDK), and provided to a live streaming user for social networking. The live streaming user can flexibly access the live streaming system anytime and anywhere, and perform social networking in a live streaming manner. For example, at least two roles are involved in live streaming, that is, an anchor (live streaming user) and a user. The anchor has a corresponding client for sharing audio/video data, and the user has a corresponding client for receiving audio/video data. The anchor shares captured or recorded footage with the user in real time by using a live streaming device (a computer, a mobile phone, or the like) or a live streaming client. The user may view the footage shared by the anchor in real time on a multimedia device (a computer, a mobile phone, a display, or the like) or a viewing client. For example, in a live streaming manner, one live broadcast involves one or more anchors, and one live broadcast may be watched by a plurality of users at the same time. For example, in a live streaming manner, the user may interact with the anchor by sending a text message, sending a gift, sending a picture, and the like.

Therefore, the multimedia playback system and the live streaming system may be integrated, so that the integrated system can have respective advantages of both systems, thereby improving the flexibility of the integrated system. For example, a relay agent is provided between the multimedia playback system and the live streaming system on a backend server, so that the live streaming system finds a device list of multimedia devices in the multimedia playback system, and calls in a corresponding multimedia device by using a standard Session Initiation Protocol (SIP), thereby implementing intercommunication of audio/video data between the multimedia playback system and the live streaming system, and greatly improving the flexibility of data transmission.

In some embodiments, the live streaming terminal is a smartphone, a tablet computer, a notebook computer, a desktop computer, or the like. The product type of the live streaming terminal is not specifically limited in this embodiment of this application. The live streaming terminal may be used as a live streaming client, and a live streaming application is installed in the live streaming client. In some embodiments, the live streaming application is an application integrated with a live streaming SDK. A Hypertext Markup Language 5 (H5) page of a JavaScript software development kit (JSSDK) may further be used in the live streaming terminal. The live streaming user may establish a network connection to the live streaming system according to the live streaming client, and enter a live streaming room for live streaming.

In an actual application, for example, the live streaming terminal determines a region in which a multimedia device to be connected is located. For example, a conference room 1102 in XX Building is used as the region in which the multimedia device to be connected is located. After the region is determined, the live streaming terminal obtains region information corresponding to the region, and finds, according to the region information, a region and a multimedia device that correspond to the region information. For example, the region information is "58633", and "conference room 1102, XX Building" and a multimedia device in "conference room 1102, XX Building" can be found according to the region information "58633".

After obtaining the region information corresponding to the region, the live streaming terminal transmits a connection request according to the region information. For example, the live streaming terminal transmits a request of dialing 58633. The request of dialing 58633 is a connection request, and the network online conference system receives the connection request. The connection request includes the region information of the region in which the multimedia device to be connected is located, that is, the region information "58633".

In an embodiment, the conference management server includes a conference service server and a scheduling policy server.

In some embodiments, the conference service server is a functional server having functions such as pulling a device list, relaying a call, and relay into a room. The conference service server may include a single device, or may be a device group including a plurality of devices. For example, the conference service server includes one or more servers.

In some embodiments, the scheduling policy server is a functional server having functions such as assigning a signaling server and a proxy server (at least one of a data transmission proxy server and a multimedia device proxy server), and managing establishment of a connection to a multimedia device. The scheduling policy server may include a single device, or may be a device group including a plurality of devices. For example, the scheduling policy server includes one or more servers.

For example, after determining that the region in which the multimedia device to be connected is located is the conference room 1102 in the XX Building and obtaining the region information "58633", the live streaming terminal transmits a connection request to the conference service server, where the connection request includes the region information "58633". After receiving the connection request, the conference service server forwards the connection request to the scheduling policy server.

In an embodiment, because it is intended to integrate the live streaming system and the multimedia playback system, the live streaming system is associated to the multimedia playback system by using a live streaming number. Specifically, before the step of "receiving, by the conference management server, a connection request transmitted by a live streaming terminal", the method further includes:

receiving, by the conference management server, a creation request transmitted by the live streaming terminal;

generating, by the conference management server, a live streaming number according to the creation request; and returning, by the conference management server, the live streaming number to the live streaming terminal, so that the live streaming terminal performs a live streaming operation according to the live streaming number.

In an actual application, for example, the conference management server receives a creation request transmitted by the live streaming terminal, creates a conference according to the creation request, generates a live streaming number corresponding to the conference, and then stores conference-related information such as the conference and the live streaming number. After generating the live streaming number, the conference management server returns the live streaming number to the live streaming terminal. After receiving the live streaming number, the live streaming terminal enters a live streaming room according to the live streaming number. In this case, the room number of the live streaming room is the received live streaming number.

In an embodiment, after receiving the live streaming number, the live streaming terminal may further present the live streaming number, so that another live streaming user joins in the live streaming room according to the live streaming number, and then the live streaming users joining in the live streaming room can watch the same audio/video content.

In an embodiment, the conference management server further includes a conference service server and a conference control server.

In some embodiments, the conference control server is a functional server having functions such as creating a conference, assigning a proxy server (a live streaming proxy server), and synchronizing port information. The conference control server may include a single device, or may be a device group including a plurality of devices. For example, the conference control server includes one or more servers.

For example, optionally, the live streaming terminal transmits a connection request to the conference service server. After receiving the connection request, the conference service server forwards the connection request to the conference control server. The conference control server creates a conference according to the connection request, generates a live streaming number, and stores conference-related information. Then, the conference control server returns the live streaming number to the conference service server, and the conference service server returns the received live streaming number to the live streaming terminal. After receiving the live streaming number, the live streaming terminal presents the live streaming number, so that another live streaming terminal joins in the live streaming room according to the live streaming number.

In an embodiment, because it is intended to view audio/video data in the live streaming system by using the multimedia playback system, a device list of multimedia devices in the multimedia playback system is obtained, so that a user selects, according to the device list, the region in which the multimedia device is located. Specifically, before the step of "receiving, by the conference management server, a connection request transmitted by a live streaming terminal", the method further includes:

receiving, by the conference management server, a device list obtaining request transmitted by the live streaming terminal;

obtaining, by the conference management server, a device list according to the device list obtaining request, the device list including a mapping relationship between the multimedia device and the region; and returning, by the conference management server, the device list to the live streaming terminal, so that the live streaming terminal selects, according to the device list, the region in which the multimedia device to be connected is located.

Figure 3:
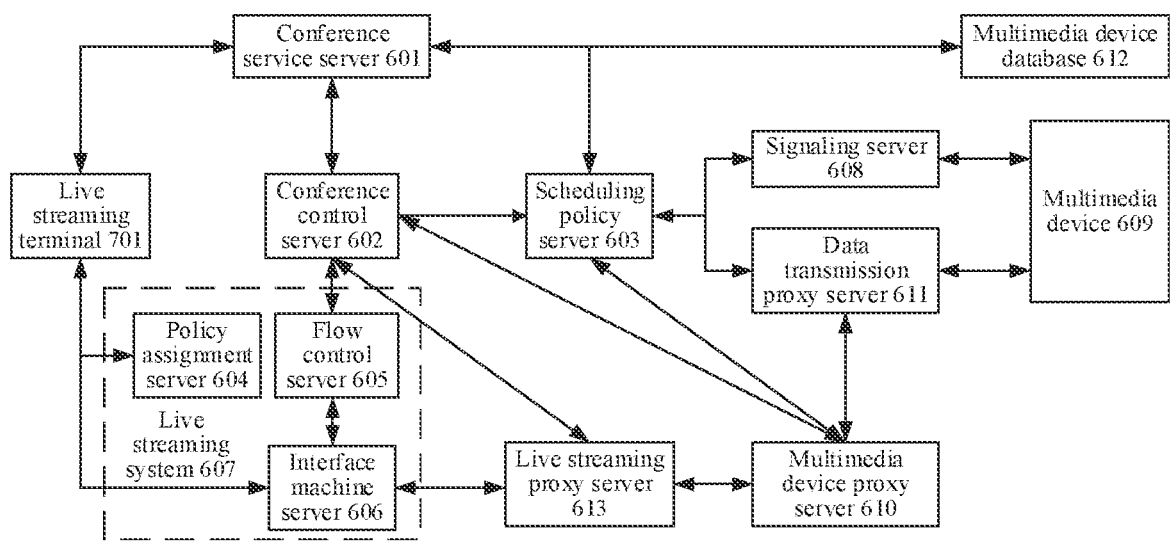
FIG. 3 is a schematic diagram of server distribution according to an embodiment of this application.

In an embodiment, for example, as shown in FIG. 3, the conference management server receives a device list obtaining request transmitted by a live streaming terminal 701, and then queries a multimedia device database 612 for a device list according to the device list obtaining request, to find a device list including a mapping relationship between multimedia devices and region. For example, one region may include a plurality of multimedia devices, and therefore, there is a mapping relationship between the region and the plurality of multimedia devices. The device list is represented in a form of, for example, "conference room 1102, XX Building-58633". Then, the device list is returned to the live streaming terminal 701. After obtaining the device list, the live streaming terminal 701 selects a region from a plurality of regions displayed in the device list as the region for data transmission. For example, a conference room 1102 is selected from a plurality of conference rooms in the device list as the region for data transmission.

In an embodiment, after obtaining the device list, the live streaming terminal may further present the device list, to notify other conference participants of a specific location of the conference region.

In an embodiment, optionally, the conference management server includes a conference service server, and the network online conference system further includes a multimedia device database. For example, the live streaming terminal transmits a device list obtaining request to the conference service server, and the conference service server queries the multimedia device database for a device list according to the device list obtaining request. After obtaining the device list, the conference service server returns the device list to the live streaming terminal. A user of the live streaming terminal selects a region according to the device list as the region for data transmission, and the live streaming terminal may further present the device list.

In an embodiment, because it cannot be ensured that all regions include a multimedia device, that is, it cannot be ensured that all regions can be used for a conference, the regions may be further filtered, to ensure the effectiveness of the region in the device list. Specifically, the step of "obtaining, by the conference management server, a device list according to the device list obtaining request" includes:

obtaining, by the conference management server, an initial device list according to the device list obtaining request;

obtaining, by the conference management server, region use information corresponding to each region in the initial device list; and updating, by the conference management server, the initial device list according to the region use information, to obtain the device list.

In an actual application, the conference management server obtains the initial device list according to the device list obtaining request. The initial device list includes a plurality of regions that are not filtered. Then, the initial device list is detected, and a region in which a video conference cannot be performed and a multimedia device corresponding to the region are deleted. For example, multimedia devices in the initial device list are detected. Upon detection of a multimedia device that is working currently, it is considered that the multimedia device is being used, that is, a region in which the multimedia device is located is being used for a conference. Therefore, the region corresponding to the multimedia device cannot be used for a video conference. In this case, the detected region and the multimedia device corresponding to the region are deleted, to update the device list. In this way, the obtained device list is more accurate, and it is ensured that all multimedia devices in the device list are in an available state, thereby improving the use efficiency for a user.

Alternatively, optionally, the conference management server may further detect a fault condition of multimedia devices in the device list. When it is detected that a multimedia device has failed or cannot work normally, the detected multimedia device is deleted, to update the device list.

Alternatively, the network online conference system may further query the region use information, and update the device list according to the region use information. For example, if it is intended to perform a video conference from 14:00 to 15:00 on May 1, when it is found that a conference room 1101 has been reserved for a conference from 14:00 to 15:00 on May 1, the conference room 1101 and each corresponding multimedia device are deleted, to update the device list.

202: The conference management server assigns the corresponding signaling server and the data transmission proxy server to a region according to region information, and triggers the signaling server to establish a connection to a multimedia device.

In some embodiments, the signaling server is a functional server having functions such as information exchange and parameter negotiation with the multimedia device. For example, the signaling server is a SIP signaling server. The SIP signaling server can perform SIP information exchange and negotiate an audio/video parameter with the multimedia device.

In some embodiments, the data transmission proxy server is a functional server having functions such as data exchange with the multimedia device. For example, the data transmission proxy server is a Real-Time Transport Protocol (RTP) proxy server. The RTP proxy server can transmit audio/video data with the multimedia device.

In an actual application, for example, after receiving a connection request including region information, the conference management server assigns, according to the region information, a SIP signaling server and an RTP proxy server to a region corresponding to the region information. Then, the SIP signaling server is triggered to initiate a standard SIP request to a multimedia device and establish a connection to the multimedia device by using a standard SIP procedure.

The SIP is a signaling control protocol at the application layer, and is used for creating, modifying, and releasing sessions of one or more participants. These sessions include at least one of a network multimedia conference, an IP phone, or a multimedia distribution, and the participants of the sessions communicate through multicast, mesh unicast, or a mixture thereof.

In an embodiment, the conference management server includes a scheduling policy server and a conference service server.

For example, after receiving a connection request including region information, the scheduling policy server assigns, according to the region information, a SIP signaling server and an RTP proxy server to a region corresponding to the region information. Then, the scheduling policy server triggers the SIP signaling server to initiate a standard SIP request to a multimedia device and establish a connection to the multimedia device by using a standard SIP procedure.

203: The conference management server assigns the multimedia device proxy server to the multimedia device in response to detecting that the connection between the signaling server and the multimedia device is successfully established.

The multimedia device proxy server is a functional server having functions such as data relay transmission between proxy servers. For example, the multimedia device proxy server transmits audio/video data to the live streaming proxy server and the data transmission proxy server.

In an actual application, for example, when it is detected that the connection between the signaling server and the multimedia device is successfully established, it indicates that the network online conference system has been successfully connected to the multimedia device. In this case, the conference management server notifies the live streaming terminal of a connection success result. Then, the conference management server assigns the multimedia device proxy server to the multimedia device, so that data is transmitted to the multimedia device by using the multimedia device proxy server.

In an embodiment, to smoothly perform data transmission, the conference management server enables, by synchronizing port information, each assigned proxy server to determine port information of another proxy server that performs the data transmission. Specifically, the data transmission method further includes:

determining, by the conference management server, port information of the data transmission proxy server and port information of the multimedia device proxy server; and synchronizing, by the conference management server, the respective port information between the data transmission proxy server and the multimedia device proxy server.

In some embodiments, the port information is information that can indicate an information communication location of a device. For example, the port information includes an Internet Protocol address (IP) and a port. The IP is a uniform address format provided by the Internet Protocol. Each network or device on the Internet includes a logical address, and differences in physical addresses are blocked by using the logical address. The port is an output port used by a device to communicate with the outside.

In an actual application, for example, the conference management server determines an IP and a port that correspond to the data transmission proxy server, and an IP and a port that correspond to the multimedia device proxy server. Then, the IP and the port that correspond to the data transmission proxy server are transmitted to the multimedia device proxy server, and the IP and the port that correspond to the multimedia device proxy server are transmitted to the data transmission proxy server. After the port information exchange ends, the data transmission proxy server and the multimedia device proxy server learn the location information of each other, so that data transmission between the data transmission proxy server and the multimedia device proxy server can be completed.

In an embodiment, as shown in FIG. 3, the conference management server includes a scheduling policy server 603, a conference service server 601, and a conference control server 602. For example, when the scheduling policy server 603 detects that a connection between a signaling server 608 and a multimedia device 609 is successfully established, the scheduling policy server 603 returns a result indicating that the connection is successfully established to the conference service server 601. Then, the conference service server 601 returns the result indicating that the connection is successfully established to the live streaming terminal 701, and transmits a device joining request to the conference control server 602. After receiving the device joining request, the conference control server 602 assigns a multimedia device proxy server 610 to the multimedia device 609, transmits an IP and a port of the multimedia device proxy server 610 to a data transmission proxy server 611, and transmits an IP and a port of the data transmission proxy server 611 to the multimedia device proxy server 610, so that the multimedia device proxy server 610 and the data transmission proxy server 611 learn the port information of each other.

204: The conference management server assigns the live streaming proxy server to the live streaming terminal in response to a live streaming operation of the live streaming terminal.

The live streaming proxy server is a functional server having functions such as data format conversion and data protocol conversion. For example, the live streaming proxy server performs format conversion on audio/video data from the live streaming terminal, to convert the format of the audio/video data into a format that can be recognized and played by the multimedia device. Alternatively, the live streaming proxy server may perform format conversion on audio/video data from the multimedia device, to convert the format of the audio/video data into a format that can be recognized and played by a live streaming application in the live streaming terminal.

In an actual application, for example, after detecting that a user of a live streaming terminal enters a live streaming room, the conference management server assigns a live streaming proxy server to the live streaming terminal. The user of the live streaming terminal enters the live streaming room by using a previously obtained live streaming number. In this case, the room number of the live streaming room is the live streaming number.

In an embodiment, after obtaining the live streaming number, the live streaming terminal presents the live streaming number, so that another live streaming terminal can also obtain the live streaming number, and join in the live streaming room according to the live streaming number. Therefore, in this case, a live streaming terminal joining in the room may be the live streaming terminal that initiates the creation request and obtains the returned live streaming number, or may be another live streaming terminal that joins in the live streaming room according to the presented live streaming number.

In an embodiment, as shown in FIG. 3, the conference management server includes the conference control server 602. The live streaming terminal 701 joins in a live streaming room by using a live streaming system 607. The live streaming system 607 includes a policy assignment server 604, a flow control server 605 (a flow control machine), and an interface machine server 606 (an interface machine).

The live streaming system is a system that compresses audio/video signals and transmits the signals to a multimedia server in response to requirements of users, to allow netizens to listen to or watch audio/video or authorize a particular group of people to listen to or watch audio/video on a network. The live streaming system applied to this embodiment of this application is a conventional live streaming system based on an audio/video SDK mode. A live streaming application in the system needs a built-in SDK, and a corresponding SDK plug-in needs to be installed in a browser in the system.

In an embodiment, the live streaming system applied to this embodiment of this application may alternatively be an improved live streaming system obtained after a conventional live streaming system is improved. A user of a web page end may directly access the improved live streaming system by using a WebRTC server in a browser kernel, and may directly perform interactive live streaming without downloading or installing the live streaming system. In addition, not only the browser, but also an application with a built-in browser kernel supporting WebRTC can access the interactive live streaming without integrating an interactive live streaming SDK.

In some embodiments, the policy assignment server is a functional server that is located in the live streaming system and that can implement services such as request authentication, signature encryption, and security confirmation. The policy assignment server assigns a nearest interface machine server, a nearest flow control server, and the like according to location information of a user, location information and load information of a device, and the like. Assignment by the policy assignment server clusters users of the same room and the same operator into the same interface machine server as far as possible.

In some embodiments, the interface machine server is a functional server that is located in the live streaming system and that can relay data, signaling, or the like through transit. For example, the interface machine server relays audio/video data in the live streaming system, and further relays signaling in the video process.

In some embodiments, the flow control server is a functional server that is located in the live streaming system and that can perform functions such as live streaming room management, parameter adjustment, and audio routing. For example, the flow control server in the live streaming system manages a live streaming room, adjusts audio/video parameters in a live streaming process in real time, and performs audio routing.

In an actual application, the live streaming terminal transmits a room entry request to the policy assignment server in the live streaming system, and then enters a live streaming room corresponding to a live streaming number through the interface machine server and the flow control server in the live streaming system. After detecting that a live streaming user enters the live streaming room, the flow control server transmits a live streaming user request to the conference control server. The live streaming user request includes an IP and a port of the interface machine server. After receiving the live streaming user request, the conference control server assigns the live streaming proxy server to the live streaming user.

In an embodiment, step 204 may alternatively be performed before step 201, that is, the conference management server first assigns the live streaming proxy server to the live streaming terminal according to the live streaming operation of the live streaming terminal, then assigns the signaling server and the data transmission proxy server to the region according to the connection request transmitted by the live streaming terminal, and assigns the multimedia device proxy server to the multimedia device when the connection between the signaling server and the multimedia device is successfully established.

It is only to be ensured that the data transmission proxy server, the multimedia device proxy server, and the live streaming proxy server are assigned before data transmission is performed between the live streaming terminal and the multimedia device. After the data transmission proxy server, the multimedia device proxy server, and the live streaming proxy server are assigned, the network online conference system performs, by using the data transmission proxy server, the multimedia device proxy server, and the live streaming proxy server, format conversion on data to be transmitted, to transmit the data between the live streaming terminal and the multimedia device.

In an embodiment, to smoothly perform data transmission, port information is synchronized, so that each assigned proxy server can determine port information of another proxy server that performs the data transmission. Specifically, the step of "assigning, by the conference management server, the live streaming proxy server to the live streaming terminal in response to a live streaming operation of the live streaming terminal" includes:

obtaining, by the conference management server, port information of an interface machine server corresponding to the live streaming operation based on the live streaming operation of the live streaming terminal;

assigning, by the conference management server, the live streaming proxy server to the live streaming terminal, and determining port information of the live streaming proxy server; and synchronizing, by the conference management server, the respective port information between the interface machine server and the live streaming proxy server.

In an actual application, for example, a live streaming user performs a live streaming operation by using a live streaming system, and the network online conference system determines, according to the live streaming operation of the live streaming user, an IP and a port that correspond to an interface machine server in the live streaming system. Then, the network online conference system assigns a live streaming proxy server to the live streaming terminal, and determines an IP and a port that correspond to the live streaming proxy server. Then, the IP and the port that correspond to the interface machine server are transmitted to the live streaming proxy server, and the IP and the port that correspond to the live streaming proxy server are transmitted to the interface machine server. After the port information exchange ends, the live streaming proxy server and the interface machine server learn location information of each other, so that data transmission between the live streaming proxy server and the interface machine server can be completed.

In an embodiment, to smoothly perform data transmission, the conference management server may enable, by synchronizing port information, each assigned proxy server to determine port information of another proxy server that performs the data transmission. Specifically, the data transmission method further includes:

determining, by the conference management server, port information of the live streaming proxy server and port information of the multimedia device proxy server; and synchronizing, by the conference management server, the respective port information between the live streaming proxy server and the multimedia device proxy server.

In an actual application, for example, as shown in FIG. 3, after assigning the live streaming proxy server 613 to the live streaming terminal 701, the conference control server 602 transmits an IP and a port that correspond to the live streaming proxy server 613 to the multimedia device proxy server 610, and transmits an IP and a port that correspond to the multimedia device proxy server 610 to the live streaming proxy server 613. After the port information exchange ends, the live streaming proxy server 613 and the multimedia device proxy server 610 learn location information of each other, so that data transmission between the live streaming proxy server 613 and the multimedia device proxy server 610 can be completed.

205: Perform, by using the data transmission proxy server, the multimedia device proxy server, and the live streaming proxy server, format conversion on data to be transmitted, to transmit the data between the live streaming terminal and the multimedia device.

In an actual application, for example, after the data transmission proxy server, the multimedia device proxy server, and the live streaming proxy server are assigned, the live streaming system and the multimedia playback system are integrated by using the data transmission proxy server, the multimedia device proxy server, and the live streaming proxy server. By using the data transmission proxy server, the multimedia device proxy server, and the live streaming proxy server, data from the live streaming terminal is transmitted to the multimedia device for playback, and data from the multimedia device may also be transmitted to the live streaming terminal for presentation, so that a user in a conference room participates in a conference by using the multimedia device, and a user of the live streaming terminal participates in the conference by using a web page or a live streaming application.

In an embodiment, a data format supported by the live streaming terminal and a data format supported by the multimedia device are not necessarily the same. Therefore, the network online conference system performs format conversion, so that the converted data is adapted to a device at a data receive end. Specifically, the step of "performing, by using the data transmission proxy server, the multimedia device proxy server, and the live streaming proxy server, format conversion on data to be transmitted, to transmit the data between the live streaming terminal and the multimedia device" includes:

receiving, by using the live streaming proxy server, audio/video live streaming data transmitted by the live streaming terminal;

performing format conversion on the audio/video live streaming data by using the live streaming proxy server, to obtain audio/video playback data; and transmitting the audio/video playback data to the multimedia device by using the data transmission proxy server, the multimedia device proxy server, and the live streaming proxy server.

In an actual application, for example, when performing live streaming, the live streaming terminal transmits audio/video live streaming data to the network online conference system. After receiving the audio/video live streaming data, the live streaming proxy server performs format conversion separately on audio live streaming data and video live streaming data in the audio/video live streaming data. The live streaming proxy server converts audio live streaming data in formats such as OPUS and AAC applied to the live streaming system into audio playback data in formats such as g.711 and g.729 applied to the multimedia device, encapsulates a UDT format into an RTP format, and then transmits the audio playback data obtained after the format conversion to the multimedia device by using the data transmission proxy server and the multimedia device proxy server.

Both the live streaming system and the multimedia device support video data in an H.264 format. Therefore, the live streaming proxy server merely encapsulates the UDT format into the RTP format, and then transmits the video playback data obtained after the format conversion to the multimedia device. After receiving the audio/video playback data, the multimedia device presents content in the audio/video playback data. In this case, a user in a conference room watches an audio/video image of a live streaming end by using the multimedia device, and participates in the conference.

In an embodiment, the format of audio/video data is not limited in this embodiment of this application. For example, the format of audio live streaming data supported by the live streaming terminal is not limited to OPUS and AAC mentioned above, the format of audio playback data supported by the multimedia device is not limited to g.711 and g.729, the format of video data is not limited to H.264, and other suitable formats may also be used.

In an embodiment, if the audio/video live streaming data transmitted by the live streaming terminal includes only audio live streaming data, the live streaming proxy server only performs format conversion on the audio live streaming data. In this case, the audio/video playback data includes only audio playback data. If the audio/video live streaming data transmitted by the live streaming terminal includes only video live streaming data, the live streaming proxy server only performs format conversion on the video live streaming data. In this case, the audio/video playback data includes only video playback data.

In an embodiment, to transmit data from the live streaming terminal to the multimedia device, the data may be transmitted by using a plurality of proxy servers. Specifically, the step of "transmitting the audio/video playback data to the multimedia device by using the data transmission proxy server, the multimedia device proxy server, and the live streaming proxy server" includes:

transmitting the audio/video playback data to the multimedia device proxy server by using the live streaming proxy server;

transmitting the audio/video playback data to the data transmission proxy server by using the multimedia device proxy server; and transmitting the audio/video playback data to the multimedia device by using the data transmission proxy server.

In an actual application, for example, the live streaming proxy server performs format conversion on received audio/video live streaming data, to convert the audio/video live streaming data into audio/video playback data, and then transmits the audio/video playback data to the multimedia device proxy server. The multimedia device proxy server transmits the audio/video playback data to the data transmission proxy server. The data transmission proxy server transmits the audio/video playback data to the multimedia device. After receiving the audio/video playback data, the multimedia device presents content in the audio/video playback data. In this case, a user in a conference room watches an audio/video image of a live streaming end by using the multimedia device, and participates in the conference.

In an embodiment, the live streaming terminal performs data transmission by using the interface machine server. For example, the live streaming terminal transmits audio/video live streaming data in a UDT format to the interface machine server of the live streaming system, and the interface machine server transmits the audio/video live streaming data to the live streaming proxy server, so that the live streaming proxy server performs format conversion and subsequent data transmission.

In an embodiment, for example, the multimedia device transmits the audio/video playback data to the data transmission proxy server, the data transmission proxy server transmits the audio/video playback data to the multimedia device proxy server, and the multimedia device proxy server transmits the audio/video playback data to the live streaming proxy server. The live streaming proxy server converts audio playback data in formats such as g.711 and g.729 into audio live streaming data in formats such as OPUS and AAC, encapsulates an RTP protocol into a UDT protocol, and then forwards the audio live streaming data to the interface machine server of the live streaming system. Both the live streaming system and the multimedia device support video data in an H.264 format. Therefore, the live streaming proxy server merely encapsulates the data of the RTP protocol into the UDT protocol, and then transmits the video live streaming data to the interface machine server. The interface machine server forwards the obtained audio live streaming data and video live streaming data to the live streaming terminal, so that the user of the live streaming terminal views content of the multimedia device.

In this case, the live streaming user of the live streaming terminal views the audio/video on the multimedia device in the conference room by using the data transmission method. The live streaming user can watch the video of the conference by using the live streaming terminal, without participating in the conference on site. Therefore, when it is inconvenient for a user to participate in a conference on site, or the cost of participating in the conference on site is excessively high, the user may participate in the conference by using the live streaming terminal. A user in the conference room can view a video image and learn ideas and views of the user at the live streaming end; the user at the live streaming end can also watch a video transmitted by the multimedia device to learn the content of the conference. In addition, the multimedia device in the conference room can be more fully used.

By using the data transmission method, a multimedia playback system in a conventional conference room can be integrated and intercommunicate with a live streaming system integrated with an SDK live streaming application. Therefore, users located in different regions can all access the conference, thereby greatly improving the flexibility of the conference. In addition, the conventional multimedia playback system in the conference room can be more fully used.

In an embodiment, the data transmission solution is not limited to a conventional multimedia playback system of a standard SIP protocol. For a multimedia playback system of a non-standard SIP protocol, compatibility modification may be performed on the data transmission solution and a protocol related to the multimedia playback system.

In an embodiment, the data transmission method is not limited to integration of the multimedia playback system and the live streaming system. The multimedia playback system may also be integrated with another system capable of implementing real-time audio/video communication.

In an embodiment, the network online conference system in this embodiment of this application may be used as a node in a distributed system. Each node in the distributed system receives input information during normal operation, and maintains shared data in the distributed system based on the received input information.

Figure 4:
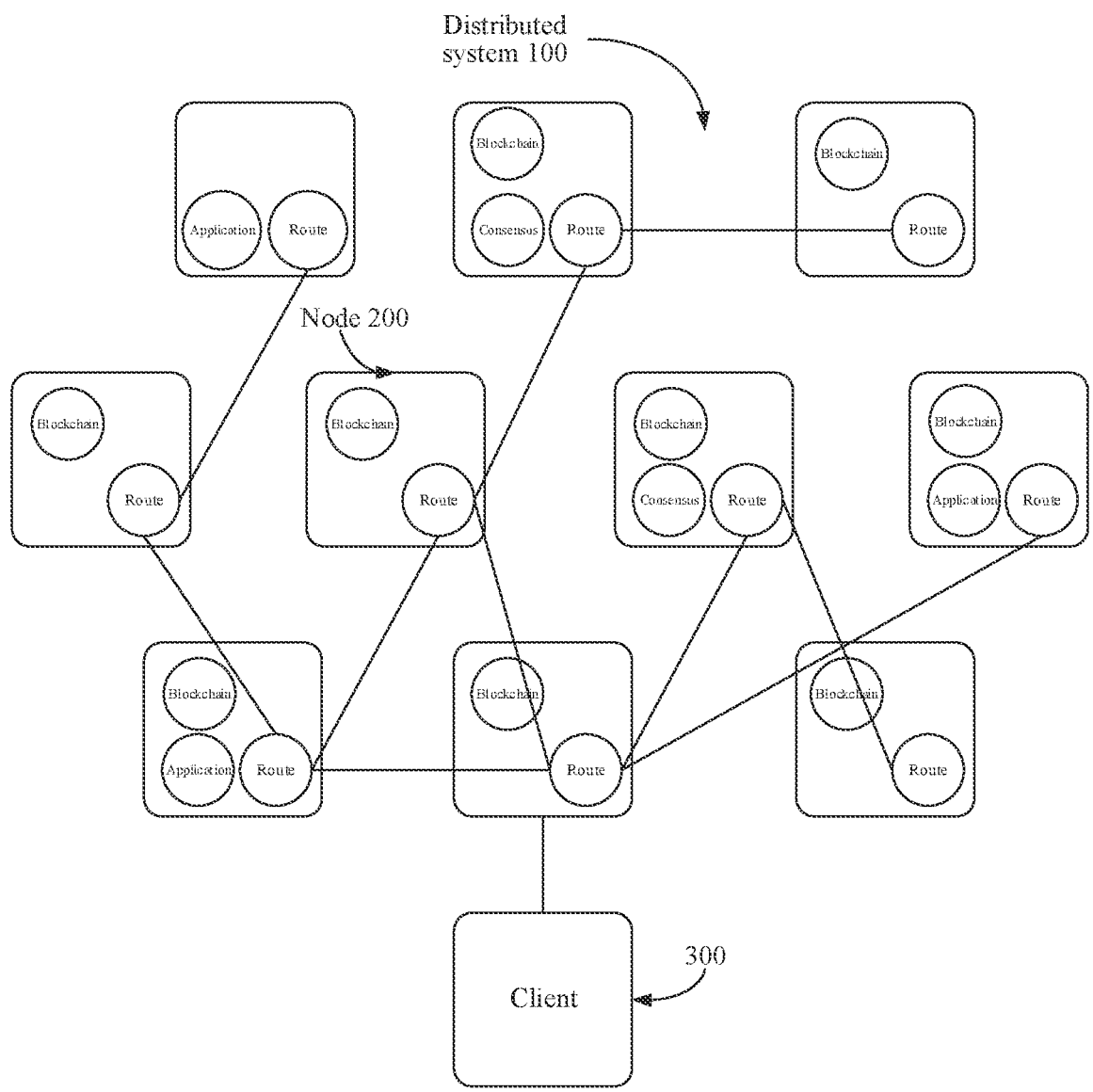
FIG. 4 is a schematic structural diagram of a distributed system applied to a blockchain system according to an embodiment of this application.

As shown in FIG. 4, the distributed system is a blockchain system. FIG. 4 is an optional schematic structural diagram of a distributed system 100 applied to a blockchain system according to an embodiment of this application. In some embodiments, the blockchain system includes a client 300 and a plurality of nodes 200. The nodes 200 form a point-to-point network. To ensure information intercommunication in the distributed system 100, optionally, each node 200 in the distributed system 100 has an information connection. In some embodiments, the nodes 200 transmit information through the information connection.

Figure 5:
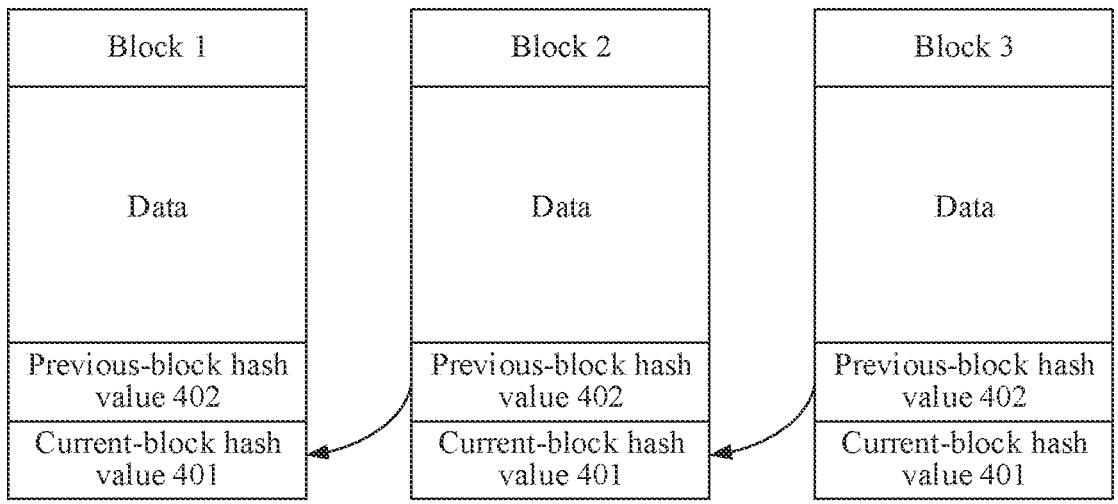
FIG. 5 is a schematic diagram of block structures according to an embodiment of this application.

As shown in FIG. 5, FIG. 5 is a schematic diagram of block structures according to an embodiment of this application. Each block includes a hash value 401 of a transaction record stored in the current block and a hash value 402 of a previous block. Blocks are connected according to hash values to form a blockchain. In addition, the block further includes information such as a timestamp indicating a block generation time. A blockchain is essentially a decentralized database, and is a string of associated data blocks generated by using a cryptology method. Each data block includes related information used for verifying the validity of information of the data block and generating a next block.

It can be learned from the foregoing descriptions that, in this embodiment of this application, the connection request transmitted by the live streaming terminal may be received; the corresponding signaling server and the data transmission proxy server are assigned to the region according to the region information, and the signaling server is triggered to establish a connection to the multimedia device; the multimedia device proxy server is assigned to the multimedia device when it is detected that the connection between the signaling server and the multimedia device is successfully established; the live streaming proxy server is assigned to the live streaming terminal based on the live streaming operation of the live streaming terminal; and format conversion is performed, by using the data transmission proxy server, the multimedia device proxy server, and the live streaming proxy server, on the data to be transmitted, to transmit the data between the live streaming terminal and the multimedia device. In this solution, a live streaming system used when a live streaming user performs live streaming and a multimedia playback system in which a multimedia device is located are integrated, so that the user can participate in a conference without arriving at a conference room. When it is inconvenient for the user to arrive at the site, the user can still participate in the conference by using the data transmission method. Therefore, data transmission between the live streaming terminal and the multimedia device is implemented, and the flexibility of data transmission is improved.

According to the method described in the foregoing embodiment, detailed descriptions are further provided below by using an example in which the data transmission apparatus is specifically integrated into a network online conference system.

Figure 6:
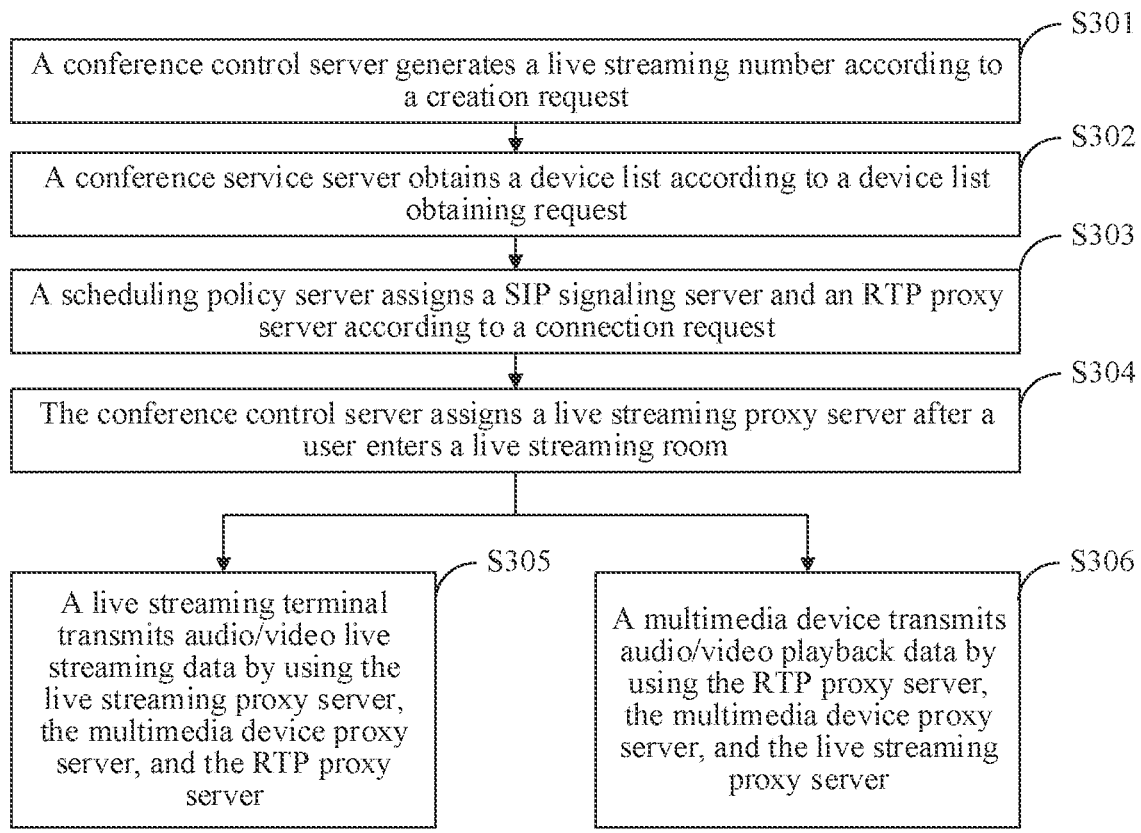
FIG. 6 is a second flowchart of a data transmission method according to an embodiment of this application.

FIG. 6 is a schematic flowchart of a data transmission method according to an embodiment of this application. The method is performed by the network online conference system shown in FIG. 1. The data transmission method provided in this embodiment of this application is specifically described by using the following embodiment:

301: A conference control server generates a live streaming number according to a creation request.

Figure 7:
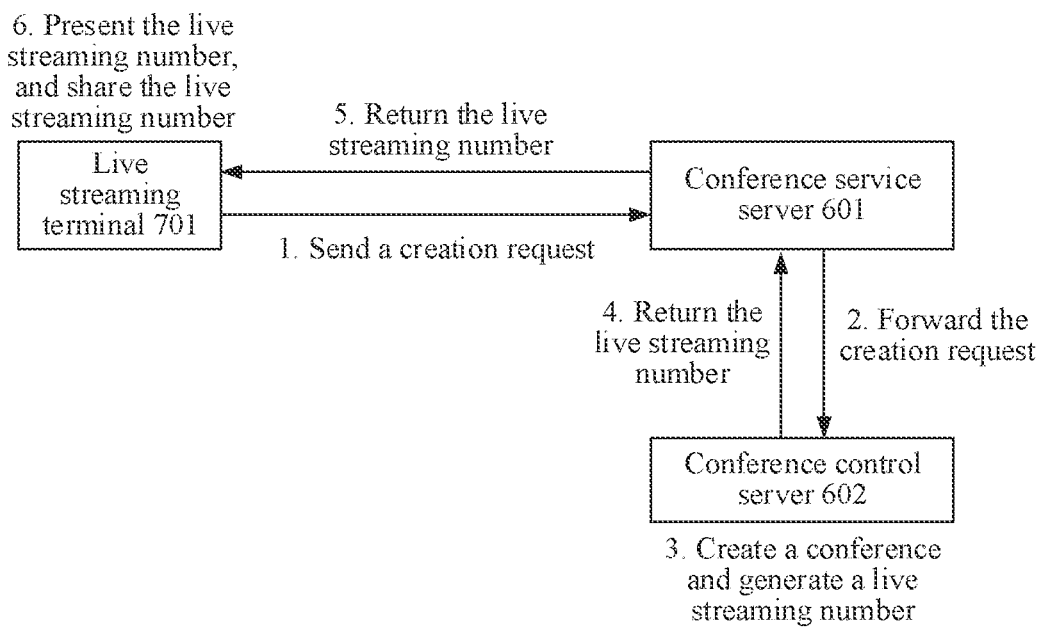
FIG. 7 is a schematic flowchart of obtaining a live streaming number according to an embodiment of this application.

In an actual application, as shown in FIG. 3, optionally, the network online conference system includes a plurality of servers, for example, functional servers such as the conference service server 601, the conference control server 602, and the scheduling policy server 603. As shown in FIG. 7, the live streaming terminal 701 transmits a creation request to the conference service server 601. After receiving the creation request, the conference service server 601 transmits the creation request to the conference control server 602. After obtaining the creation request, the conference control server 602 creates a conference according to the creation request, generates a live streaming number corresponding to the conference, and then stores the created conference and the live streaming number.

After generating the live streaming number, the conference control server returns the live streaming number to the conference service server. After obtaining the live streaming number, the conference service server returns the live streaming number to the live streaming terminal. After obtaining the live streaming number, the live streaming terminal presents the live streaming number, to notify another user of the live streaming number.

In an embodiment, the live streaming terminal may further share the live streaming number, so that another user joins in the conference according to the live streaming number. For example, the live streaming terminal sends a message or a link including the live streaming number to another user by using a communication tool, to share information.

In an embodiment, for example, a user A shares a live streaming number with a user B and a user C by using a live streaming terminal. After obtaining the live streaming number, the user B and the user C may input information such as a nickname or a password in a live streaming system, and then enter a live streaming room by using a live streaming room entering process. The room number of the live streaming room is the obtained live streaming number. The user A may also enter the live streaming room corresponding to the live streaming number, so that the user A, the user B, and the user C all enter the live streaming room corresponding to the live streaming number, thereby implementing live streaming interaction between users.

302: A conference service server obtains a device list according to a device list obtaining request.

Figure 8:
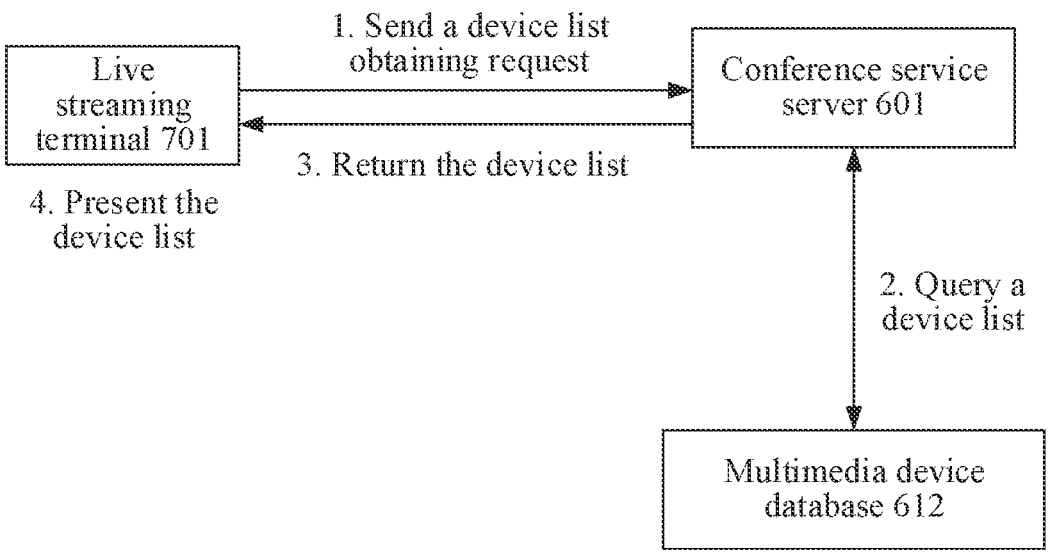
FIG. 8 is a schematic flowchart of obtaining a device list according to an embodiment of this application.

In an actual application, as shown in FIG. 8, the live streaming terminal 701 transmits a device list obtaining request to the conference service server 601. After obtaining the device list obtaining request, the conference service server 601 queries the multimedia device database 612 for a device list. After the device list is found, the device list is returned to the live streaming terminal 701. The device list includes a mapping relationship between conference rooms and multimedia devices. For example, optionally, one conference room corresponds to a plurality of multimedia devices. In some embodiments, the device list includes a plurality of conference rooms and multimedia devices corresponding to the conference rooms. After obtaining the device list, the live streaming terminal presents the plurality of conference rooms in the device list for a user to select a conference room.

In an embodiment, for example, the device list is represented as "conference room 1102, XX Building-58633". A corresponding conference room may be obtained according to "conference room 1102, XX Building", and then a multimedia device corresponding to the conference room is obtained. The corresponding conference room may alternatively be obtained according to "58633", and then the multimedia device corresponding to the conference room is obtained. In addition, the live streaming terminal may further transmit a request of dialing 58633 to the conference service server according to "58633".

In an embodiment, the conference service server finds an initial device list from the multimedia device database. After finding the initial device list, the conference service server further detects the initial device list, and deletes a conference room in which a video conference cannot be performed and a multimedia device corresponding to the conference room. For example, multimedia devices in the initial device list are detected. Upon detection of a multimedia device that is working currently, it is considered that the multimedia device is being used, that is, a conference room in which the multimedia device is located is being used for a conference. Therefore, the conference room corresponding to the multimedia device cannot be used for a video conference. The detected conference room and the multimedia device corresponding to the conference room are deleted, to update the device list. In this way, the obtained device list is more accurate, and it is ensured that all conference rooms in the device list are in an available state, thereby improving the use efficiency for a user.

Alternatively, use information of the conference room is queried, and the device list is updated according to the use information of the conference room. For example, if it is intended to perform a video conference from 14:00 to 15:00 on May 1, when it is found that a conference room 1101 has been reserved for a conference from 14:00 to 15:00 on May 1, the conference room 1101 and each corresponding multimedia device are deleted, to update the device list.

303: A scheduling policy server assigns a SIP signaling server and an RTP proxy server according to a connection request.

Figure 9:
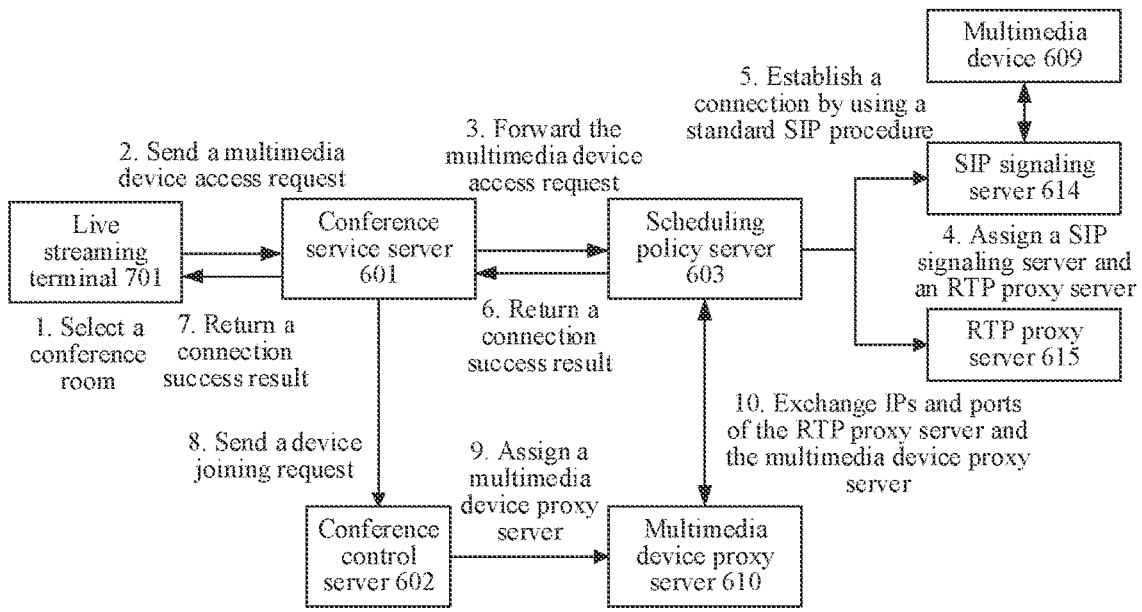
FIG. 9 is a first schematic flowchart of proxy module assignment according to an embodiment of this application.

In an actual application, as shown in FIG. 9, after obtaining the device list, the live streaming terminal 701 selects a conference room for a video conference from the plurality of conference rooms in the device list. For example, "conference room 1102, XX Building" is selected as the conference room for the video conference. Then, the live streaming terminal 701 transmits a connection request to the conference service server 601. For example, the connection request is a request of dialing 58633. The connection request carries information "58633" of the conference room, and the information "58633" of the conference room corresponds to "conference room 1102, XX Building" selected by the user. After obtaining the connection request, the conference service server 601 forwards the connection request to the scheduling policy server 603.

After obtaining the connection request, the scheduling policy server 603 assigns a SIP signaling server 614 and an RTP proxy server 615 according to the conference room selected by the user. Then, the SIP signaling server 614 initiates a standard SIP request to a multimedia device 609 corresponding to the conference room selected by the user, and establishes a connection to the multimedia device by using a standard SIP procedure. After the connection between the SIP signaling server 614 and the multimedia device 609 is successfully established, a result is returned to the conference service server 601, to notify the conference service server 601 that the connection is successfully established.

After learning that the connection between the SIP signaling server 614 and the multimedia device 609 is successfully established, the conference service server 601 returns the result to the live streaming terminal 701, to notify the live streaming terminal 701 that the connection is successfully established. In some embodiments, the conference service server 601 transmits a device joining request to the conference control server 602. After receiving the device joining request, the conference control server 602 assigns a multimedia device proxy server 610 to the multimedia device 609. The scheduling policy server 603 transmits an IP and a port of the RTP proxy server 615 to the multimedia device proxy server 610, and transmits an IP and a port of the multimedia device proxy server 610 to the RTP proxy server 615, so that the multimedia device proxy server 610 and the RTP proxy server 615 learn the location of each other.

304: The conference control server assigns a live streaming proxy server after a user enters a live streaming room.

Figure 10:
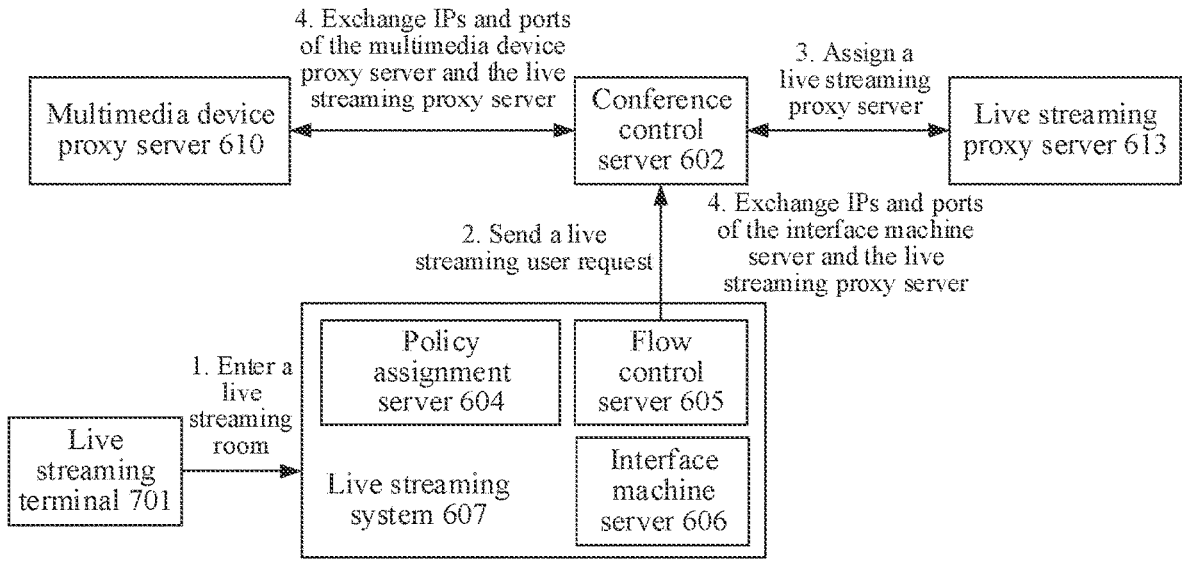
FIG. 10 is a second schematic flowchart of proxy module assignment according to an embodiment of this application.

In an actual application, for example, as shown in FIG. 10, a live streaming user of the live streaming terminal 701 enters a live streaming room by using a live streaming system 607 according to a live streaming room entering process, and the room number of the live streaming room is the previously obtained live streaming number. The live streaming system 607 includes a policy assignment server 604, a flow control server 605, an interface machine server 606, and the like. After the live streaming user enters the live streaming room, the flow control server 605 transmits a live streaming user request to the conference control server 602. The live streaming user request includes an IP and a port of the interface machine server 606.

After receiving the live streaming user request, the conference control server 602 assigns a live streaming proxy server 613 to the live streaming user. Then, the IP and the port of the interface machine server 606 are transmitted to the live streaming proxy server 613, and an IP and a port of the live streaming proxy server 613 are transmitted to the interface machine server 606, so that the interface machine server 606 and the live streaming proxy server 613 learn the location of each other. In addition, the IP and the port of the live streaming proxy server 613 are transmitted to the multimedia device proxy server 610, and the IP and the port of the multimedia device proxy server 610 are transmitted to the live streaming proxy server 613, so that the multimedia device proxy server 610 and the live streaming proxy server 613 learn the location of each other.

305: A live streaming terminal transmits audio/video live streaming data by using the live streaming proxy server, the multimedia device proxy server, and the RTP proxy server.

Figure 11:
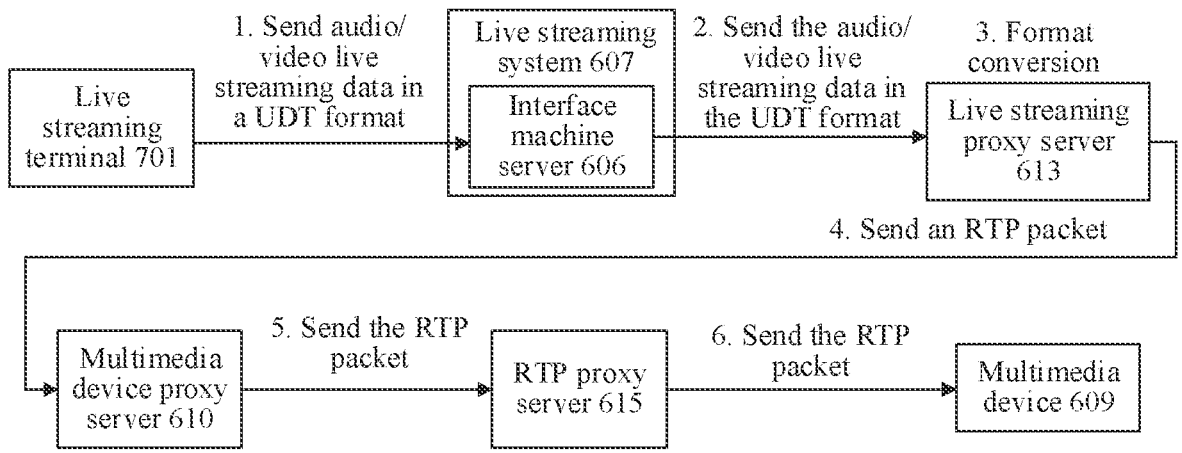
FIG. 11 is a first schematic flowchart of data transmission according to an embodiment of this application.

In an actual application, for example, as shown in FIG. 11, the live streaming terminal 701 transmits audio/video live streaming data in a UDT format to the interface machine server 606 in the live streaming system 607. For example, the live streaming terminal 701 transmits the audio/video live streaming data to the interface machine server 606 by recording audio/video in a live streaming room or uploading audio/video. After receiving the audio/video live streaming data from the live streaming terminal 701, the interface machine server 606 transmits the audio/video live streaming data to the live streaming proxy server 613.

A format of audio/video data supported in the live streaming system 607 is not necessarily the same as a format of audio/video data supported in the multimedia device. Therefore, the live streaming proxy server 613 implements the step of format conversion, so that the multimedia device can play the audio/video data from the live streaming system. After receiving the audio/video live streaming data, the live streaming proxy server 613 performs format conversion separately on audio live streaming data and video live streaming data in the audio/video live streaming data. The live streaming proxy server 613 converts audio live streaming data in formats such as OPUS and AAC applied to interactive live streaming into audio playback data in formats such as g.711 and g.729 applied to the multimedia device, encapsulates a UDT format into an RTP format, and then transmits the audio playback data obtained after the format conversion to the multimedia device proxy server 610.

Both the live streaming system 607 and the multimedia device 609 support video data in an H.264 format. Therefore, the live streaming proxy server 613 merely encapsulates the UDT format into the RTP format, and then transmits the video playback data obtained after the format conversion to the multimedia device proxy server 610.

After the multimedia device proxy server 610 receives the audio playback data and the video playback data, the audio playback data and the video playback data are collectively referred to as an RTP packet. The multimedia device proxy server 610 forwards the RTP packet to the RTP proxy server 615. After receiving the RTP packet, the RTP proxy server 615 transmits the RTP packet to the multimedia device 609. After receiving the RTP packet, the multimedia device 609 presents content in the RTP packet. In this case, a user in the conference room can view a video image of a live streaming end.

In an embodiment, if the audio/video live streaming data transmitted by the live streaming terminal includes only audio live streaming data, the live streaming proxy server only performs format conversion on the audio live streaming data. In this case, the RTP packet includes only audio playback data. If the audio/video live streaming data transmitted by the live streaming terminal includes only video live streaming data, the live streaming proxy server only performs format conversion on the video live streaming data. In this case, the RTP packet includes only video playback data.

306: A multimedia device transmits audio/video playback data by using the RTP proxy server, the multimedia device proxy server, and the live streaming proxy server.

Figure 12:
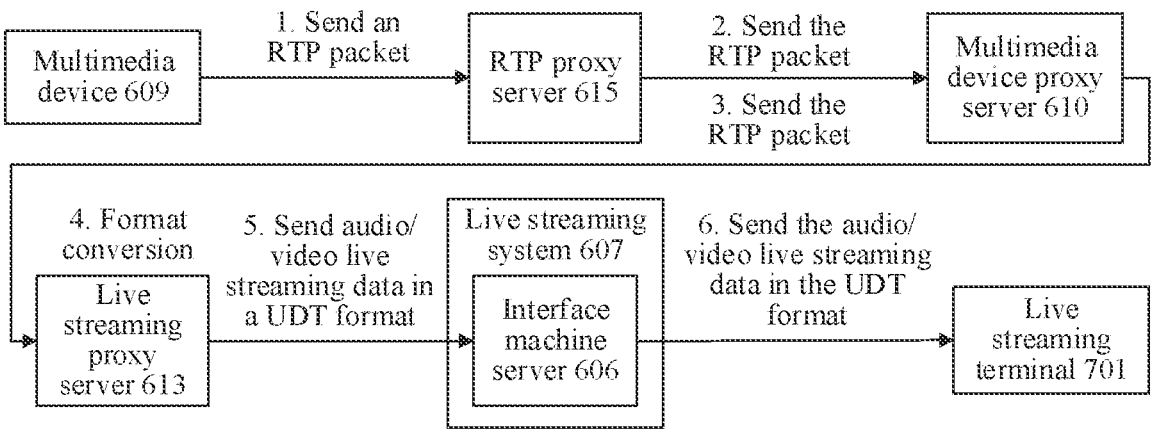
FIG. 12 is a second schematic flowchart of data transmission according to an embodiment of this application.

In an actual application, for example, as shown in FIG. 12, the multimedia device 609 transmits an RTP packet to the RTP proxy server 615. After receiving the RTP packet, the RTP proxy server 615 forwards the RTP packet to the multimedia device proxy server 610. Then, the multimedia device proxy server 610 transmits the RTP packet to the live streaming proxy server 613. The RTP packet is audio/video playback data.

The live streaming proxy server 613 performs format conversion separately on audio playback data and video playback data in the RTP packet. The live streaming proxy server 613 converts audio playback data in formats such as g.711 and g.729 into audio live streaming data in formats such as OPUS and AAC, encapsulates an RTP protocol into a UDT protocol, and then forwards the audio live streaming data to the interface machine server 606 of the live streaming system 607. Both the live streaming system 607 and the multimedia device 609 support video data in an H.264 format. Therefore, the live streaming proxy server 613 merely encapsulates the data of the RTP protocol into data of the UDT protocol, and then transmits the video live streaming data to the interface machine server 606. The interface machine server 606 forwards the obtained audio live streaming data and video live streaming data to the live streaming terminal 701 for a user to view.

In this case, a live streaming user of the live streaming terminal may watch a video on the multimedia device in the conference room by using the data transmission method. The live streaming user can watch the video of the conference by using a live streaming application of the live streaming terminal, without participating in the conference on site. Therefore, when it is inconvenient for a user to participate in a conference on site, or the cost of participating in the conference on site is excessively high, the user may participate in the conference by using the live streaming application. A user in the conference room can view a video image of the live streaming user and learn ideas and views of the live streaming user; the user of the live streaming terminal can also watch a video transmitted by the multimedia device to learn the content of the conference.

By using the data transmission method, a multimedia playback system in a conference room can be integrated and intercommunicate with a live streaming system integrated with an SDK live streaming application. Therefore, users located in different regions can all access the conference, thereby greatly improving the flexibility of the conference. In addition, the conventional conference system in the conference room can be more fully used.

It can be learned from the foregoing descriptions that, in this embodiment of this application, the conference control server generates the live streaming number according to the creation request; the conference service server obtains the device list according to the device list obtaining request; the scheduling policy server assigns the SIP signaling server and the RTP proxy server according to the connection request; the conference control server assigns the live streaming proxy server after the user enters the live streaming room; the live streaming terminal transmits the audio/video live streaming data by using the live streaming proxy server, the multimedia device proxy server, and the RTP proxy server; and the multimedia device transmits the audio/video playback data by using the RTP proxy server, the multimedia device proxy server, and the live streaming proxy server. In this solution, a live streaming system used when a live streaming user performs live streaming and a multimedia playback system in which a multimedia device is located are integrated, so that the user can participate in a conference without arriving at a conference room. When it is inconvenient for the user to arrive at the site, the user can still participate in the conference by using the data transmission method. Therefore, data transmission between the live streaming terminal and the multimedia device is implemented, and the flexibility of data transmission is improved.

To better implement the foregoing method, an embodiment of this application may further provide a data transmission apparatus. The data transmission apparatus may be specifically integrated into a network online conference system. The network online conference system may include a server, a terminal, or the like. The terminal may include a mobile phone, a tablet computer, a notebook computer, a personal computer (PC), or the like.

Figure 13:
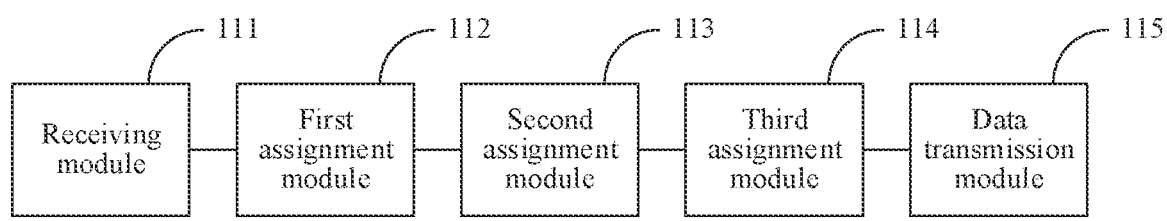
FIG. 13 is a schematic structural diagram of a data transmission apparatus according to an embodiment of this application.

For example, as shown in FIG. 13, the data transmission apparatus may include a receiving module 111, a first assignment module 112, a second assignment module 113, a third assignment module 114, and a data transmission module 115.

The receiving module 111 is configured to receive a connection request transmitted by a live streaming terminal, the connection request including region information of a region in which a multimedia device to be connected is located.

The first assignment module 112 is configured to assign a corresponding signaling server and a data transmission proxy server to the region according to the region information, and trigger the signaling server to establish a connection to the multimedia device.

The second assignment module 113 is configured to assign a multimedia device proxy server to the multimedia device in response to detecting that the connection between the signaling server and the multimedia device is successfully established.

The third assignment module 114 is configured to assign a live streaming proxy server to the live streaming terminal in response to a live streaming operation of the live streaming terminal.

The data transmission module 115 is configured to perform, by using the data transmission proxy server, the multimedia device proxy server, and the live streaming proxy server, format conversion on data to be transmitted, to transmit the data between the live streaming terminal and the multimedia device.

In an embodiment, the third assignment module 114 may be specifically configured to:

obtain port information of an interface machine corresponding to the live streaming operation based on the live streaming operation of the live streaming terminal;

assign the live streaming proxy server to the live streaming terminal, and determine port information of the live streaming proxy server; and synchronize the respective port information between the interface machine and the live streaming proxy server.

In an embodiment, the data transmission module 115 may include a first receiving submodule 1151, a conversion submodule 1152, and a transmission submodule 1153.

The first receiving submodule 1151 is configured to receive, by using the live streaming proxy server, audio/video live streaming data transmitted by the live streaming terminal.

The conversion submodule 1152 is configured to perform format conversion on the audio/video live streaming data by using the live streaming proxy server, to obtain audio/video playback data.

The transmission submodule 1153 is configured to transmit the audio/video playback data to the multimedia device by using the data transmission proxy server, the multimedia device proxy server, and the live streaming proxy server.

In an embodiment, the transmission submodule 1153 may be specifically configured to:

transmit the audio/video playback data to the multimedia device proxy server by using the live streaming proxy server;

transmit the audio/video playback data to the data transmission proxy server by using the multimedia device proxy server; and transmit the audio/video playback data to the multimedia device by using the data transmission proxy server.

In an embodiment, the data transmission apparatus may further include a second receiving submodule 1211, a generation submodule 1212, and a first returning submodule 1213.

The second receiving submodule 1211 is configured to receive a creation request transmitted by the live streaming terminal.

The generation submodule 1212 is configured to generate a live streaming number according to the creation request.

The first returning submodule 1213 is configured to return the live streaming number to the live streaming terminal, so that the live streaming terminal performs the live streaming operation according to the live streaming number.

In an embodiment, the data transmission apparatus may further include a third receiving submodule 1221, a list obtaining submodule 1222, and a second returning submodule 1223.

The third receiving submodule 1221 is configured to receive a device list obtaining request transmitted by the live streaming terminal.

The list obtaining submodule 1222 is configured to obtain a device list according to the device list obtaining request, the device list including a mapping relationship between the multimedia device and the region.

The second returning submodule 1223 is configured to return the device list to the live streaming terminal, so that the live streaming terminal selects, according to the device list, the region in which the multimedia device to be connected is located.

In an embodiment, the data transmission apparatus may further include a first determining submodule 1231 and a first synchronization submodule 1232.

The first determining submodule 1231 is configured to determine port information of the data transmission proxy server and port information of the multimedia device proxy server.

The first synchronization submodule 1232 is configured to synchronize the respective port information between the data transmission proxy server and the multimedia device proxy server.

In an embodiment, the data transmission apparatus may further include a second determining submodule 1241 and a second synchronization submodule 1242.

The second determining submodule 1241 is configured to determine port information of the live streaming proxy server and port information of the multimedia device proxy server.

The second synchronization submodule 1242 is configured to synchronize the respective port information between the live streaming proxy server and the multimedia device proxy server.

In an embodiment, the apparatus further includes a server configured to store the port information into a blockchain.

During specific implementation, the foregoing units may be implemented as independent entities, or may be randomly combined, or may be implemented as one entity or several entities. For specific implementation of the foregoing units, reference may be made to the foregoing method embodiments. Details are not described herein again.

It can be learned from the foregoing descriptions that, in this embodiment of this application, the receiving module 111 may receive the connection request transmitted by the live streaming terminal; the first assignment module 112 assigns the corresponding signaling server and the data transmission proxy server to the region according to the region information, and triggers the signaling server to establish a connection to the multimedia device; the second assignment module 113 assigns the multimedia device proxy server to the multimedia device when it is detected that the connection between the signaling server and the multimedia device is successfully established; the third assignment module 114 assigns the live streaming proxy server to the live streaming terminal based on the live streaming operation of the live streaming terminal; and the data transmission module 115 performs, by using the data transmission proxy server, the multimedia device proxy server, and the live streaming proxy server, format conversion on the data to be transmitted, to transmit the data between the live streaming terminal and the multimedia device. In this solution, a live streaming system used when a live streaming user performs live streaming and a playback system in which a multimedia device is located may be integrated, so that the user can participate in a conference without arriving at a conference room. When it is inconvenient for the user to arrive at the site, the user can still participate in the conference by using the data transmission method. Therefore, data transmission between the live streaming terminal and the multimedia device is implemented, and the flexibility of data transmission is improved.

An embodiment of this application further provides a network online conference system. The network online conference system may integrate any data transmission apparatus provided in the embodiments of this application.

In an embodiment, the network online conference system may further be used as a node in a distributed system. Each node in the distributed system can receive input information during normal operation, and maintain shared data in the distributed system based on the received input information. The distributed system may be a blockchain system. The blockchain system may include a client and a plurality of nodes (a computing device in any form that accesses a network, for example, a server or a user terminal). To ensure information intercommunication in the distributed system, each node in the distributed system may have an information connection, and the nodes may transmit information through the information connection.

Figure 14:
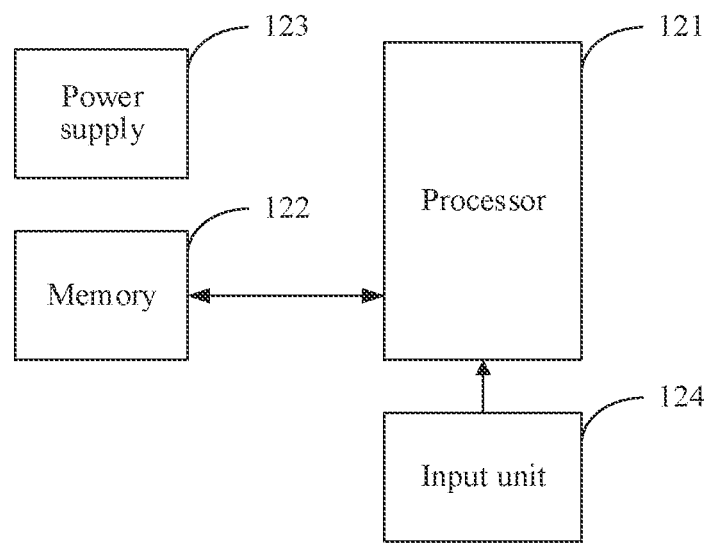
FIG. 14 is a schematic structural diagram of a network online conference system according to an embodiment of this application.

For example, FIG. 14 is a schematic structural diagram of a network device (e.g., network online conference system) according to an embodiment of this application. Specifically:

The network online conference system may include components such as a processor 121 including one or more processing cores, a memory 122 including one or more computer-readable storage media, a power supply 123, and an input unit 124. A person skilled in the art may understand that the structure of the network online conference system shown in FIG. 14 does not constitute a limitation to the network online conference system, and the network online conference system may include more or fewer components than those shown in the figure, or some components may be combined, or a different component deployment may be used.

The processor 121 is a control center of the network online conference system, and connects various parts of the entire network online conference system by using various interfaces and lines. By running or executing software programs and/or modules stored in the memory 122, and invoking data stored in the memory 122, the processor 401 performs various functions and data processing of the network online conference system, thereby performing overall monitoring on the network online conference system. In some embodiments, the processor 121 may include one or more processing cores. Preferably, the processor 121 may integrate an application processor and a modem processor. The application processor mainly processes an operating system, a user interface, an application, and the like, and the modem processor mainly processes wireless communication. It may be understood that the foregoing modem processor may either not be integrated into the processor 121.

The memory 122 may be configured to store a software program and module. The processor 121 runs the software program and module stored in the memory 122, to implement various functional applications and data processing. The memory 122 may mainly include a program storage area and a data storage area. The program storage area may store an operating system, an application program required by at least one function (such as a sound playback function and an image display function), and the like. The data storage area may store data created according to use of the network online conference system, and the like. In addition, the memory 122 may include a high speed random access memory, and may further include a non-volatile memory, such as at least one magnetic disk storage device, a flash memory, or another volatile solid-state storage device. Correspondingly, the memory 122 may further include a memory controller, to provide access of the processor 121 to the memory 122.

The network online conference system further includes the power supply 123 for supplying power to the components. Preferably, the power supply 123 may be logically connected to the processor 121 by using a power management system, thereby implementing functions such as charging, discharging, and power consumption management by using the power management system. The power supply 123 may further include one or more of a direct current or alternating current power supply, a re-charging system, a power failure detection circuit, a power supply converter or inverter, a power supply state indicator, and any other components.

The network online conference system may further include the input unit 124. The input unit 124 may be configured to receive input digit or character information and generate keyboard, mouse, joystick, optical, or trackball signal input related to user settings and function control.

Although not shown in the figure, the network online conference system may further include a display unit, and the like. Details are not described herein again. Specifically, in this embodiment, the processor 121 in the network online conference system may load executable files corresponding to processes of one or more application programs to the memory 122 according to the following instructions, and runs the application programs stored in the memory 122 to implement the following functions:

receiving a connection request transmitted by a live streaming terminal; assigning a corresponding signaling server and a data transmission proxy server to a region according to region information, and triggering the signaling server to establish a connection to a multimedia device; assigning a multimedia device proxy server to the multimedia device when it is detected that the connection between the signaling server and the multimedia device is successfully established; assigning a live streaming proxy server to the live streaming terminal in response to a live streaming operation of the live streaming terminal; and performing, by using the data transmission proxy server, the multimedia device proxy server, and the live streaming proxy server, format conversion on data to be transmitted, to transmit the data between the live streaming terminal and the multimedia device.

For specific implementations of the foregoing operations, reference may be made to the foregoing embodiments. Details are not described herein again.

It can be learned from the foregoing descriptions that, in this embodiment of this application, the connection request transmitted by the live streaming terminal may be received; the corresponding signaling server and the data transmission proxy server are assigned to the region according to the region information, and the signaling server is triggered to establish a connection to the multimedia device; the multimedia device proxy server is assigned to the multimedia device when it is detected that the connection between the signaling server and the multimedia device is successfully established; the live streaming proxy server is assigned to the live streaming terminal based on the live streaming operation of the live streaming terminal; and format conversion is performed, by using the data transmission proxy server, the multimedia device proxy server, and the live streaming proxy server, on the data to be transmitted, to transmit the data between the live streaming terminal and the multimedia device. In this solution, a live streaming system used when a live streaming user performs live streaming and a playback system in which a multimedia device is located may be integrated, so that the user can participate in a conference without arriving at a conference room. When it is inconvenient for the user to arrive at the site, the user can still participate in the conference by using the data transmission method. Therefore, data transmission between the live streaming terminal and the multimedia device is implemented, and the flexibility of data transmission is improved.

A person of ordinary skill in the art may understand that, all or some steps of the methods in the foregoing embodiments may be implemented through instructions, or implemented through instructions controlling relevant hardware, and the instructions may be stored in a computer-readable storage medium and loaded and executed by a processor.

Accordingly, an embodiment of this application provides a computer device, storing a plurality of instructions, the instructions being suitable to be loaded by a processor, to perform the steps of the data transmission method according to the embodiments of this application. For example, the instructions may perform the following steps:

receiving a connection request transmitted by a live streaming terminal; assigning a corresponding signaling server and a data transmission proxy server to a region according to region information, and triggering the signaling server to establish a connection to a multimedia device; assigning a multimedia device proxy server to the multimedia device when it is detected that the connection between the signaling server and the multimedia device is successfully established; assigning a live streaming proxy server to the live streaming terminal in response to a live streaming operation of the live streaming terminal; and performing, by using the data transmission proxy server, the multimedia device proxy server, and the live streaming proxy server, format conversion on data to be transmitted, to transmit the data between the live streaming terminal and the multimedia device.

For specific implementations of the foregoing operations, reference may be made to the foregoing embodiments. Details are not described herein again.

The storage medium may include: a read-only memory (ROM), a random access memory (RAM), a magnetic disk, an optical disc, or the like.

Since the instructions stored in the storage medium may perform the steps of any data transmission method in the embodiments of this application, the instructions can implement beneficial effects that can be implemented by any data transmission method in the embodiments of this application. For details, refer to the foregoing embodiments. Details are not further described herein.

According to another aspect, a computer program product is provided, the computer program product or computer program including computer instructions, the computer instructions being stored in a computer-readable storage medium. A processor of a computer device reads the computer instructions from the computer-readable storage medium, and executes the computer instructions, so that the computer device performs the data transmission method provided in the foregoing optional implementations.

The data transmission method and apparatus, and the computer storage medium provided in the embodiments of this application are described above in detail. Although the principles and implementations of this application are described by using specific examples in this specification, the descriptions of the foregoing embodiments are merely intended to help understand the method and the core idea of this application. Meanwhile, a person skilled in the art may make modifications to the specific implementations and application range according to the idea of this application. In conclusion, the content of this specification shall not be construed as a limitation to this application.

The sequence numbers of the embodiments of this application are merely for description purpose, and do not indicate the preference among the embodiments.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a ROM, a magnetic disk, an optical disc, or the like.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A data transmission method, applied to a system comprising a conference management server, a signaling server, a data transmission proxy server, a multimedia device proxy server, and a live streaming proxy server, the method comprising:

receiving, by the conference management server, a connection request transmitted by a live streaming terminal transmitting streaming data in a first data format, the connection request comprising location information of a region in which a multimedia device to be connected is located, wherein the multimedia device is selected from a plurality of multimedia devices of a multimedia playback system that transmits data in a second data format between the plurality of multimedia devices by using private line network, the second data format being different from the first data format;

assigning, by the conference management server, the signaling server and the data transmission proxy server to the region according to the location information, wherein the signaling server establishes a connection to the multimedia device and performs information exchange and parameter negotiation with the multimedia device, and the data transmission proxy server transmits audio/video data to the multimedia device;

assigning, by the conference management server, the multimedia device proxy server to the multimedia device in response to detecting that the connection between the signaling server and the multimedia device is successfully established;

assigning, by the conference management server, the live streaming proxy server to the live streaming terminal in response to a live streaming operation of the live streaming terminal, wherein the multimedia device proxy server relays audio/video data between the live streaming proxy server and the data transmission proxy server; and performing, by using the data transmission proxy server, the multimedia device proxy server, and the live streaming proxy server, format conversion on the streaming data from the live streaming terminal to the multimedia device from the first data format to the second data format.

2. The data transmission method according to claim 1, wherein the performing, by using the data transmission proxy server, the multimedia device proxy server, and the live streaming proxy server, format conversion on data to be transmitted between the live streaming terminal and the multimedia device comprises:

receiving, by using the live streaming proxy server, multimedia live streaming data transmitted by the live streaming terminal;

performing format conversion on the multimedia live streaming data by using the live streaming proxy server, to obtain multimedia playback data; and transmitting the multimedia playback data to the multimedia device by using the data transmission proxy server, the multimedia device proxy server, and the live streaming proxy server.

3. The data transmission method according to claim 2, wherein the transmitting the multimedia playback data to the multimedia device by using the data transmission proxy server, the multimedia device proxy server, and the live streaming proxy server comprises:

transmitting the multimedia playback data to the multimedia device proxy server by using the live streaming proxy server;

transmitting the multimedia playback data to the data transmission proxy server by using the multimedia device proxy server; and transmitting the multimedia playback data to the multimedia device by using the data transmission proxy server.

4. The data transmission method according to claim 1, wherein before the receiving, by the conference management server, a connection request transmitted by a live streaming terminal, the method further comprises:

receiving, by the conference management server, a creation request transmitted by the live streaming terminal;

generating, by the conference management server, a live streaming number according to the creation request; and returning, by the conference management server, the live streaming number to the live streaming terminal, so that the live streaming terminal performs the live streaming operation according to the live streaming number.

5. The data transmission method according to claim 1, wherein before the receiving, by the conference management server, a connection request transmitted by a live streaming terminal, the method further comprises:
   receiving, by the conference management server, a device list obtaining request transmitted by the live streaming terminal;
   obtaining, by the conference management server, a device list according to the device list obtaining request, the device list comprising a mapping relationship between the multimedia device and the region; and
   returning, by the conference management server, the device list to the live streaming terminal, so that the live streaming terminal selects, according to the device list, the region in which the multimedia device to be connected is located.

6. The data transmission method according to claim 1, wherein the assigning, by the conference management server, the live streaming proxy server to the live streaming terminal in response to a live streaming operation of the live streaming terminal comprises:
   obtaining, by the conference management server, port information of an interface machine corresponding to the live streaming operation based on the live streaming operation of the live streaming terminal;
   assigning the live streaming proxy server to the live streaming terminal, and determining port information of the live streaming proxy server; and
   synchronizing, by the conference management server, the respective port information between the interface machine and the live streaming proxy server.

7. The data transmission method according to claim 6, further comprising:
   storing, by the conference management server, the port information into a blockchain.

8. The data transmission method according to claim 1, further comprising:
   determining, by the conference management server, port information of the data transmission proxy server and port information of the multimedia device proxy server; and
   synchronizing, by the conference management server, the respective port information between the data transmission proxy server and the multimedia device proxy server.

9. The data transmission method according to claim 1, further comprising:
   determining, by the conference management server, port information of the live streaming proxy server and port information of the multimedia device proxy server; and
   synchronizing, by the conference management server, the respective port information between the live streaming proxy server and the multimedia device proxy server.

10. A computer system, comprising a conference management server, a signaling server, a data transmission proxy server, a multimedia device proxy server, and a live streaming proxy server, the computer system including one or more processors and memory storing computer-executable files, wherein the computer-executable files, when executed by the one or more processors, cause the computer system configured to perform a method comprising:
    receiving, by the conference management server, a connection request transmitted by a live streaming terminal transmitting streaming data in a first data format, the connection request comprising location information of a region in which a multimedia device to be connected is located, wherein the multimedia device is selected from a plurality of multimedia devices of a multimedia playback system that transmits data in a second data format between the plurality of multimedia devices by using private line network, the second data format being different from the first data format;
    assigning, by the conference management server, the signaling server and the data transmission proxy server to the region according to the location information, wherein the signaling server establishes a connection to the multimedia device and performs information exchange and parameter negotiation with the multimedia device, and the data transmission proxy server transmits audio/video data to the multimedia device;
    assigning, by the conference management server, the multimedia device proxy server to the multimedia device in response to detecting that the connection between the signaling server and the multimedia device is successfully established;
    assigning, by the conference management server, the live streaming proxy server to the live streaming terminal in response to a live streaming operation of the live streaming terminal, wherein the multimedia device proxy server relays audio/video data between the live streaming proxy server and the data transmission proxy server; and
    performing, by using the data transmission proxy server, the multimedia device proxy server, and the live streaming proxy server, format conversion on the streaming data from the live streaming terminal to the multimedia device from the first data format to the second data format.

11. The computer system according to claim 10, wherein the performing, by using the data transmission proxy server, the multimedia device proxy server, and the live streaming proxy server, format conversion on data to be transmitted between the live streaming terminal and the multimedia device comprises:
    receiving, by using the live streaming proxy server, multimedia live streaming data transmitted by the live streaming terminal;
    performing format conversion on the multimedia live streaming data by using the live streaming proxy server, to obtain multimedia playback data; and
    transmitting the multimedia playback data to the multimedia device by using the data transmission proxy server, the multimedia device proxy server, and the live streaming proxy server.

12. The computer system according to claim 10, wherein the transmitting the multimedia playback data to the multimedia device by using the data transmission proxy server, the multimedia device proxy server, and the live streaming proxy server comprises:
    transmitting the multimedia playback data to the multimedia device proxy server by using the live streaming proxy server;
    transmitting the multimedia playback data to the data transmission proxy server by using the multimedia device proxy server; and
    transmitting the multimedia playback data to the multimedia device by using the data transmission proxy server.

13. The computer system according to claim 10, wherein before the receiving, by the conference management server, a connection request transmitted by a live streaming terminal, the plurality of operations further comprise:
- receiving, by the conference management server, a creation request transmitted by the live streaming terminal;
- generating, by the conference management server, a live streaming number according to the creation request; and
- returning, by the conference management server, the live streaming number to the live streaming terminal, so that the live streaming terminal performs the live streaming operation according to the live streaming number.

14. The computer system according to claim 10, wherein before the receiving, by the conference management server, a connection request transmitted by a live streaming terminal, the plurality of operations further comprise:
- receiving, by the conference management server, a device list obtaining request transmitted by the live streaming terminal;
- obtaining, by the conference management server, a device list according to the device list obtaining request, the device list comprising a mapping relationship between the multimedia device and the region; and
- returning, by the conference management server, the device list to the live streaming terminal, so that the live streaming terminal selects, according to the device list, the region in which the multimedia device to be connected is located.

15. The computer system according to claim 10, wherein the assigning, by the conference management server, the live streaming proxy server to the live streaming terminal in response to a live streaming operation of the live streaming terminal comprises:
- obtaining, by the conference management server, port information of an interface machine corresponding to the live streaming operation based on the live streaming operation of the live streaming terminal;
- assigning the live streaming proxy server to the live streaming terminal, and determining port information of the live streaming proxy server; and
- synchronizing, by the conference management server, the respective port information between the interface machine and the live streaming proxy server.

16. The computer system according to claim 15, wherein the plurality of operations further comprise:
- storing, by the conference management server, the port information into a blockchain.

17. The computer system according to claim 10, wherein the plurality of operations further comprise:
- determining, by the conference management server, port information of the data transmission proxy server and port information of the multimedia device proxy server; and
- synchronizing, by the conference management server, the respective port information between the data transmission proxy server and the multimedia device proxy server.

18. The computer system according to claim 10, wherein the plurality of operations further comprise:
- determining, by the conference management server, port information of the live streaming proxy server and port information of the multimedia device proxy server; and
- synchronizing, by the conference management server, the respective port information between the live streaming proxy server and the multimedia device proxy server.

19. A non-transitory computer-readable storage medium, storing a plurality of computer programs, the computer programs, when executed by a computer system comprising a conference management server, a signaling server, a data transmission proxy server, a multimedia device proxy server, and a live streaming proxy server, causing the system to perform a method including:
- receiving, by the conference management server, a connection request transmitted by a live streaming terminal transmitting streaming data in a first data format, the connection request comprising location information of a region in which a multimedia device to be connected is located, wherein the multimedia device is selected from a plurality of multimedia devices of a multimedia playback system that transmits data in a second data format between the plurality of multimedia devices by using private line network, the second data format being different from the first data format;
- assigning, by the conference management server, the signaling server and the data transmission proxy server to the region according to the location information, wherein the signaling server establishes a connection to the multimedia device and performs information exchange and parameter negotiation with the multimedia device, and the data transmission proxy server transmits audio/video data to the multimedia device;
- assigning, by the conference management server, the multimedia device proxy server to the multimedia device in response to detecting that the connection between the signaling server and the multimedia device is successfully established;
- assigning, by the conference management server, the live streaming proxy server to the live streaming terminal in response to a live streaming operation of the live streaming terminal, wherein the multimedia device proxy server relays audio/video data between the live streaming proxy server and the data transmission proxy server; and
- performing, by using the data transmission proxy server, the multimedia device proxy server, and the live streaming proxy server, format conversion on the streaming data from the live streaming terminal to the multimedia device from the first data format to the second data format.

20. The non-transitory computer-readable storage medium according to claim 19, wherein the performing, by using the data transmission proxy server, the multimedia device proxy server, and the live streaming proxy server, format conversion on data to be transmitted between the live streaming terminal and the multimedia device comprises:
- receiving, by using the live streaming proxy server, multimedia live streaming data transmitted by the live streaming terminal;
- performing format conversion on the multimedia live streaming data by using the live streaming proxy server, to obtain multimedia playback data; and
- transmitting the multimedia playback data to the multimedia device by using the data transmission proxy server, the multimedia device proxy server, and the live streaming proxy server.

* * * * *